United States Patent
Saito et al.

(10) Patent No.: US 12,345,430 B2
(45) Date of Patent: Jul. 1, 2025

(54) AIR-CONDITIONING OPERATION TERMINAL, COMPUTER-READABLE MEDIUM AND AIR-CONDITIONING SYSTEM

(71) Applicant: Mitsubishi Electric Corporation, Tokyo (JP)

(72) Inventors: Keita Saito, Tokyo (JP); Shinichiro Otani, Tokyo (JP); Tomooki Ukiana, Tokyo (JP); Masanori Nakata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 457 days.

(21) Appl. No.: 17/968,036

(22) Filed: Oct. 18, 2022

(65) Prior Publication Data

US 2023/0040665 A1    Feb. 9, 2023

Related U.S. Application Data

(63) Continuation of application No. PCT/JP2020/020678, filed on May 26, 2020.

(51) Int. Cl.
*F24F 11/52* (2018.01)
*G06V 20/40* (2022.01)

(52) U.S. Cl.
CPC .............. *F24F 11/52* (2018.01); *G06V 20/46* (2022.01)

(58) Field of Classification Search
CPC .. F24F 11/52; F24F 11/79; F24F 11/64; F24F 11/56; F24F 13/08; G06V 20/46
See application file for complete search history.

(56) References Cited

U.S. PATENT DOCUMENTS 7,124,053 B2 * 10/2006 Tanaka ..................... G06T 7/80
702/152
2014/0362002 A1   12/2014 Nakasu et al.
(Continued)

FOREIGN PATENT DOCUMENTS

EP    2 982 911 A1    2/2016
JP    9-118123 A      5/1997
(Continued)

OTHER PUBLICATIONS

Indian Office Action dated Jan. 4, 2023 issued in corresponding Indian Application No. 202247057522 with an English Translation.
(Continued)

*Primary Examiner* — Mohammad Ali
*Assistant Examiner* — Vincent W Chang
(74) *Attorney, Agent, or Firm* — Birch, Stewart, Kolasch & Birch, LLP

(57) ABSTRACT

An image acquisition unit (211) acquires a photographed image obtained by photographing an air-conditioning indoor unit including a plurality of air outlets. An image collation unit (212) collates a template image wherein an air-conditioning indoor unit of a same type as the air-conditioning indoor unit is shown with the photographed image. An air outlet identification unit (213) determines an air outlet identifier of each air outlet in the photographed image based on a collation result, and on air outlet identification data indicating an air outlet identifier to be associated with each air outlet in the template image. An identification result display unit (214) displays the photographed image by superimposing the air outlet identifier on each air outlet in the photographed image.

6 Claims, 23 Drawing Sheets

(56) References Cited

U.S. PATENT DOCUMENTS

| | | | |
|---|---|---|---|
| 2015/0061841 A1* | 3/2015 | Lee .................... G08C 23/04 |
| | | | 340/12.5 |
| 2015/0139552 A1 | 5/2015 | Xiao et al. | |
| 2016/0033156 A1 | 2/2016 | Okazaki et al. | |
| 2017/0307246 A1* | 10/2017 | Ohara ..................... F24F 11/58 | |
| 2019/0120517 A1 | 4/2019 | Gyota | |
| 2019/0285306 A1* | 9/2019 | Kitazaki ................. F24F 11/64 | |
| 2020/0064011 A1 | 2/2020 | Nakano | |
| 2021/0097214 A1* | 4/2021 | Halberstadt ............. G06T 7/579 | |
| 2021/0190350 A1* | 6/2021 | Chikkala ................. F24F 11/65 | |
| 2021/0190363 A1* | 6/2021 | Otsuki .................... F24F 11/63 | |
| 2023/0250990 A1* | 8/2023 | Udaka ..................... F24F 11/79 | |
| | | | 700/276 |
| 2024/0159418 A1* | 5/2024 | Watanabe ................ F24F 11/52 | |

FOREIGN PATENT DOCUMENTS

| | | |
|---|---|---|
| JP | 2006-99163 A | 4/2006 |
| JP | 2008-151385 A | 7/2008 |
| JP | 2009-133550 A | 6/2009 |
| JP | 2013-206377 A | 10/2013 |
| JP | 2014-56486 A | 3/2014 |
| JP | 2014-64115 A | 4/2014 |
| JP | 2014-161166 A | 9/2014 |
| JP | 2014-190686 A | 10/2014 |
| JP | 2014-241005 A | 12/2014 |
| JP | 2015-106244 A | 6/2015 |
| JP | 2015-115649 A | 6/2015 |
| JP | 2015-524103 A | 8/2015 |
| JP | 2016-35343 A | 3/2016 |
| JP | 2016-66837 A | 4/2016 |
| JP | 2016-76746 A | 5/2016 |
| JP | 2016-144065 A | 8/2016 |
| JP | 2016-212720 A | 12/2016 |
| WO | WO 2014/162975 A1 | 10/2014 |
| WO | WO 2017/179116 A1 | 10/2017 |
| WO | WO 2017/195286 A1 | 11/2017 |
| WO | WO 2018/042621 A1 | 3/2018 |
| WO | WO 2018/147319 A1 | 8/2018 |

OTHER PUBLICATIONS

International Search Report (PCT/ISA/210), issued in PCT/JP2020/020678, dated Aug. 18, 2020.
Japanese Notice of Reasons for Refusal, issued in Application No. 2021-508021, dated Jun. 8, 2021.
Written Opinion of the International Searching Authority (PCT/ISA/237), issued in PCT/JP2020/020678, dated Aug. 18, 2020.

* cited by examiner

Fig. 8
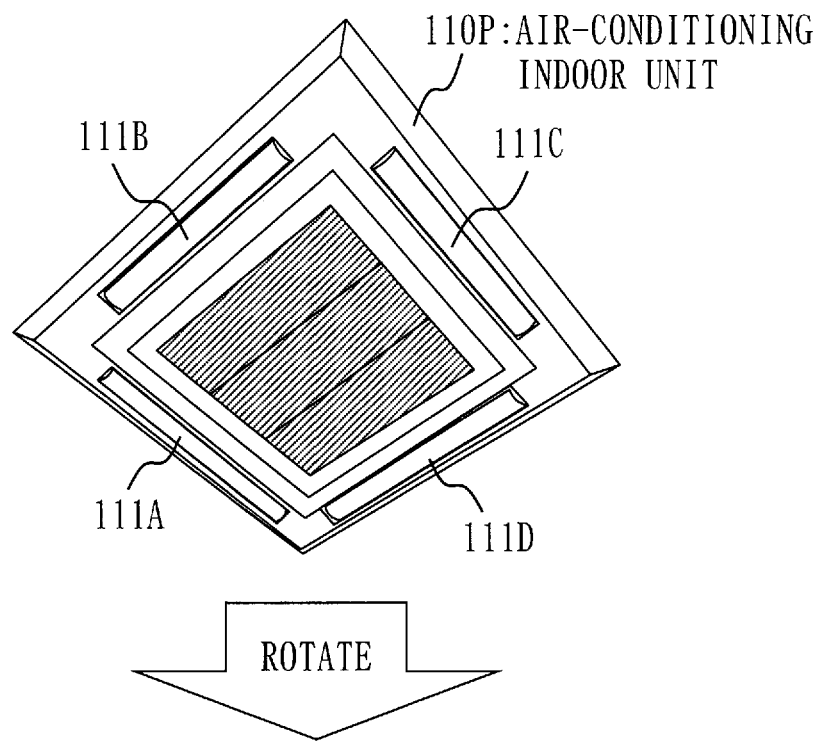
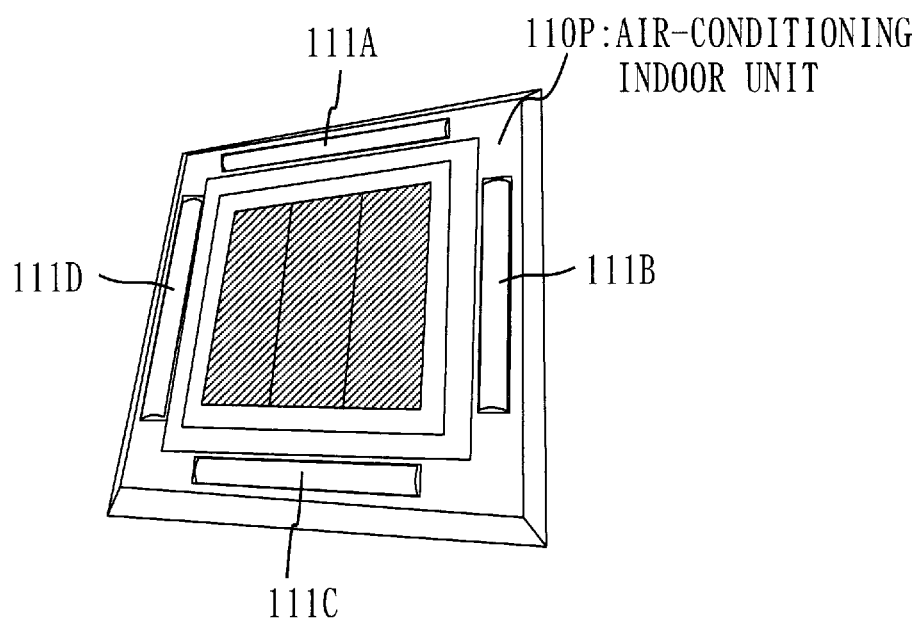

Fig. 9
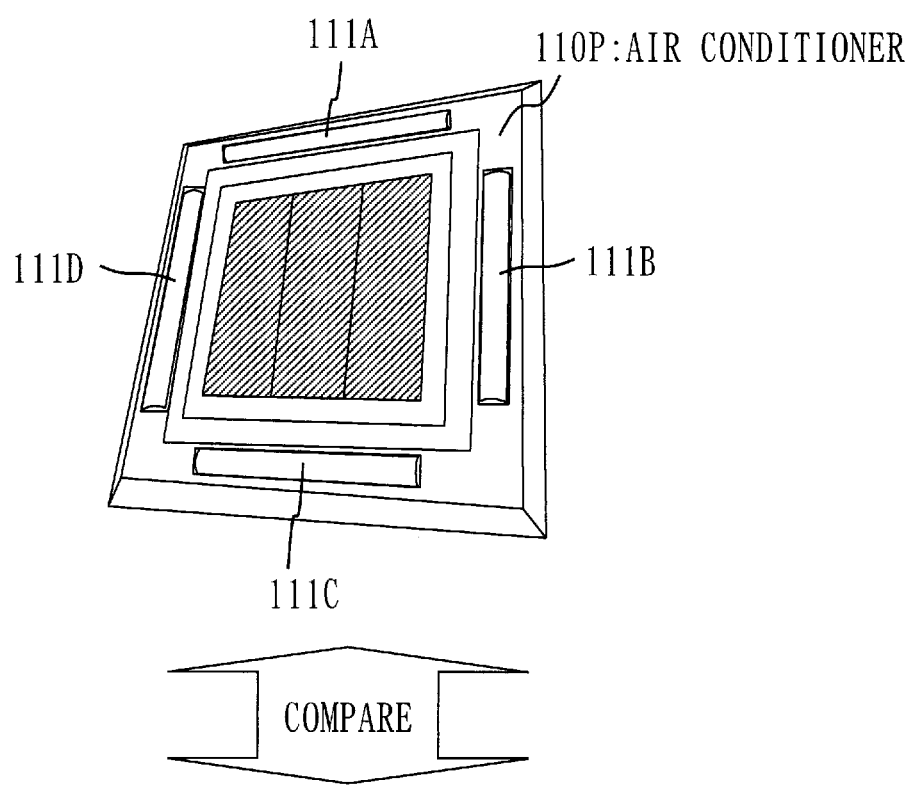
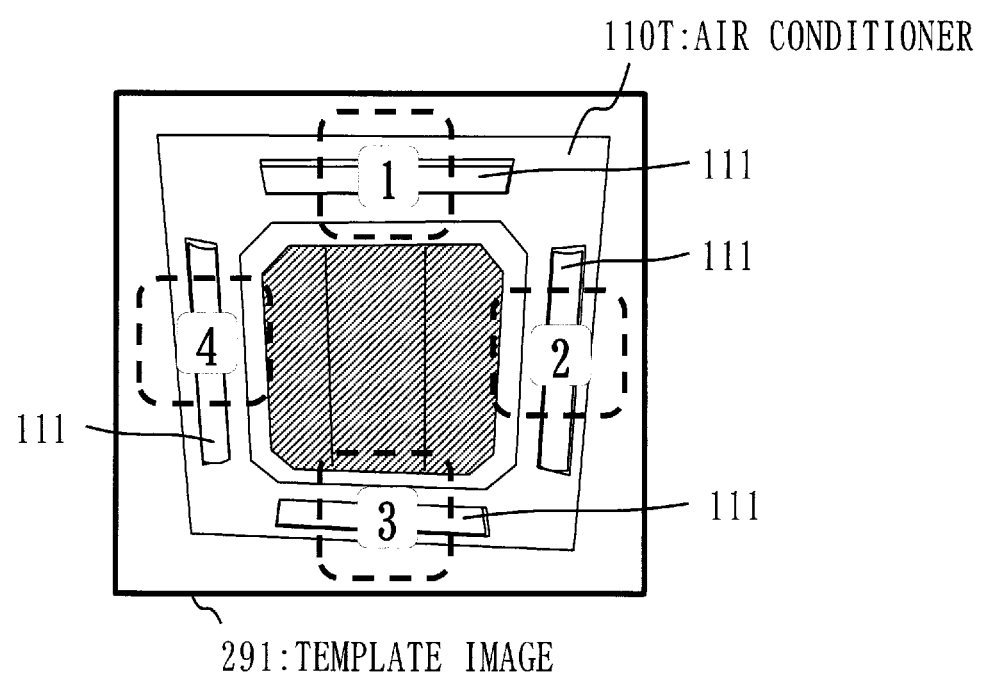

AIR-CONDITIONING OPERATION TERMINAL, COMPUTER-READABLE MEDIUM AND AIR-CONDITIONING SYSTEM

CROSS REFERENCE TO RELATED APPLICATIONS

This application is a Continuation of PCT International Application No. PCT/JP2020/020678, filed on May 26, 2020, which is hereby expressly incorporated by reference into the present application.

TECHNICAL FIELD

The present disclosure relates to an operation of an air conditioner.

BACKGROUND ART

There exists an air conditioner whereof an indoor unit has a plurality of air outlets. For example, many of ceiling cassette type indoor units have a plurality of air outlets.

When these air conditioners are used, it is possible to realize more comfortable indoor environment by adjusting a wind direction and an air volume, etc. for each air outlet.

Patent Literature 1 discloses a technique to perform an operation to change wind directions and air volumes by using a terminal device like a smartphone.

In this technique, a virtual space image corresponding to air blown out from an air outlet of an indoor unit is displayed on a screen, and a user performs the operation to change the wind direction and the air volume by touching the screen.

CITATION LIST

Patent Literature

Patent Literature 1: JP 2014-190686 A

SUMMARY OF INVENTION

Technical Problem

Patent Literature 1 is directed to an operation of an air conditioner whereof an indoor unit has one air outlet, and does not disclose an operation with respect to an air conditioner whereof an indoor unit has a plurality of air outlets to adjust the wind direction and the air volume, etc. for each air outlet.

The present disclosure is aimed at enabling an operation with respect to an air conditioner whereof an indoor unit has a plurality of air outlets to adjust the wind direction and the air volume, etc. for each air outlet.

Solution to Problem

An air-conditioning operation terminal according to one aspect of present disclosure includes:
- an image acquisition unit to acquire a photographed image obtained by photographing an air-conditioning indoor unit including a plurality of air outlets;
- an image collation unit to collate a template image wherein an air-conditioning indoor unit of a same type as the air-conditioning indoor unit is shown with the photographed image;
- an air outlet identification unit to determine, based on a collation result, and an air outlet identification data indicating an air outlet identifier to be associated with each of a plurality of air outlets in the template image, an air outlet identifier of each of the plurality of air outlets in the photographed image; and an identification result display unit to display the photographed image by superimposing the air outlet identifier on each of the plurality of air outlets in the photographed image.

Advantageous Effects of Invention

According to the present disclosure, when an indoor unit of an air conditioner is photographed, each of a plurality of air outlets is identified in an image acquired by photographing. Therefore, it is possible for a user to correctly specify an air outlet whose wind direction and air volume, etc. are desired to be adjusted.

Therefore, with respect to an air conditioner whereof an indoor unit has a plurality of air outlets, it is possible to perform an operation to adjust the wind direction and the air volume, etc. for each air outlet.

BRIEF DESCRIPTION OF DRAWINGS

FIG. 8 is an explanatory diagram of step S130 according to the first embodiment;

FIG. 9 is an explanatory diagram of step S130 according to the first embodiment;

DESCRIPTION OF EMBODIMENTS

Figure 1:
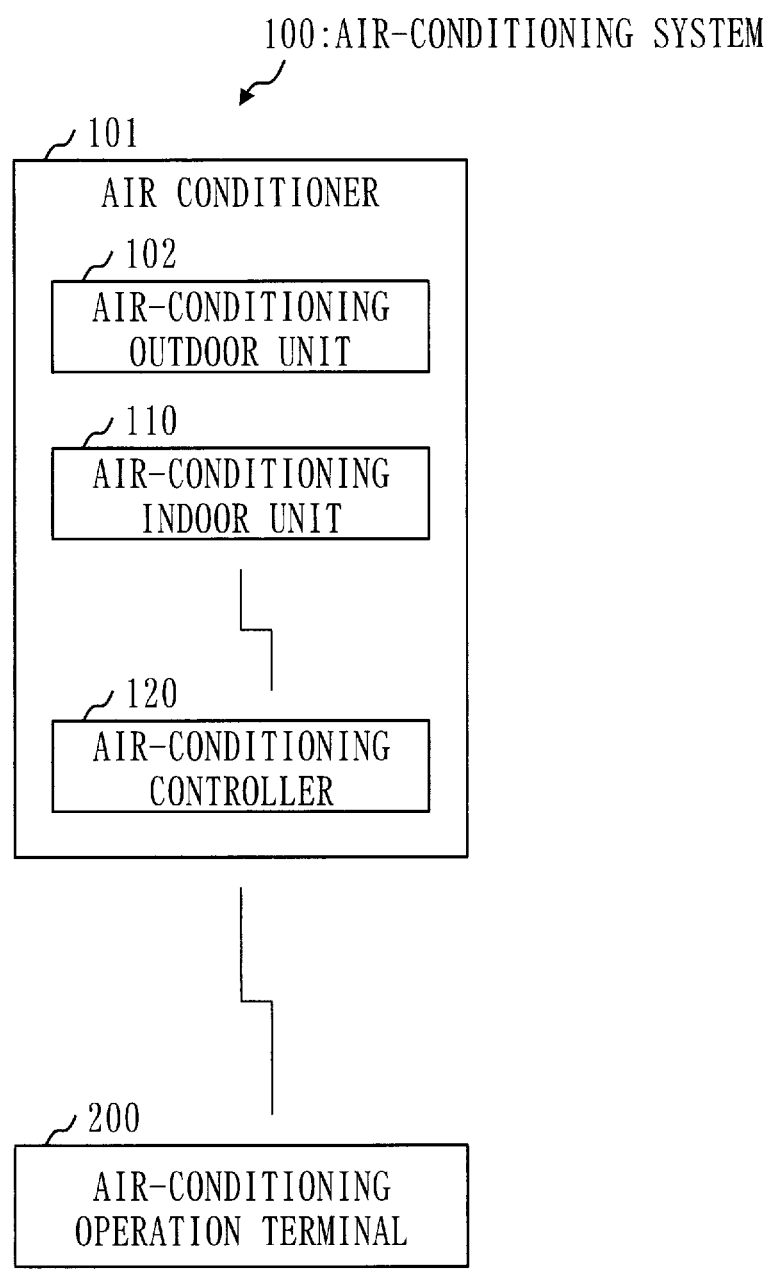
FIG. 1 is a configuration diagram of an air-conditioning system 100 according to a first embodiment.

In embodiments and diagrams, same elements or corresponding elements are denoted by same reference numerals. Description of the elements denoted by the same reference numerals as elements that have been described is omitted or simplified appropriately. Arrows in the diagrams mainly illustrate flows of data or flows of processing.

First Embodiment

Description is made on an air-conditioning system 100 based on FIG. 1 through
FIG. 10.

Explanation of Configuration

Based on FIG. 1, description is made on a configuration of the air-conditioning system 100.

The air-conditioning system 100 includes an air conditioner 101 and an air-conditioning operation terminal 200.

The air conditioner 101 includes an outdoor unit, an indoor unit and a remote controller.

The outdoor unit of the air conditioner 101 is referred to as "air-conditioning outdoor unit 102."

The indoor unit of the air conditioner 101 is referred to as "air-conditioning indoor unit 110."

The remote controller of the air conditioner 101 is referred to as "air-conditioning controller 120."

The air-conditioning controller 120 may be either a wired remote controller or a wireless remote controller.

The air-conditioning controller 120 is connected to the air-conditioning indoor unit 110 by wire or wirelessly, to control the air-conditioning indoor unit 110.

The air-conditioning operation terminal 200 is a terminal used in various operations for air conditioning. For example, a smart phone is used as the air-conditioning operation terminal 200.

The air-conditioning operation terminal 200 communicates with the air conditioner 101 wirelessly. Specifically, the air-conditioning operation terminal 200 communicates with the air-conditioning controller 120 via Bluetooth (registered trademark). Bluetooth (registered trademark) is an example of short-range wireless communication techniques.

Figure 2:
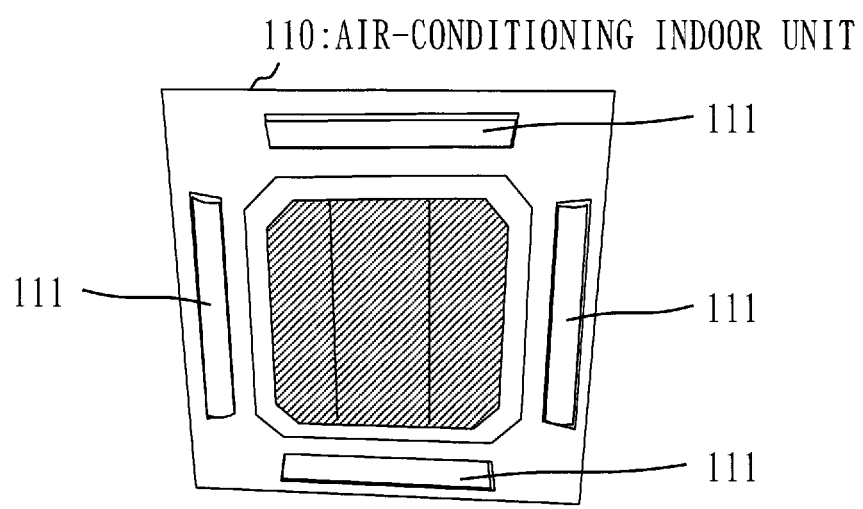
FIG. 2 is a configuration diagram of an air-conditioning indoor unit 110 according to the first embodiment.

Based on FIG. 2, description is made on a configuration of the air-conditioning indoor unit 110.

The air-conditioning indoor unit 110 includes a plurality of air outlets 111. An air outlet 111 may be also called "vane."

It is possible for the air-conditioning indoor unit 110 to adjust blowout air for each of the air outlets 111. Specifically, the air-conditioning indoor unit 110 adjusts the wind direction and the air volume, etc. for each of the air outlets 111.

Items (a wind direction and an air volume, etc.) of blowout air which can be adjusted are referred to as "adjustment items."

Specific contents of adjustment are referred to as "adjustment contents." For example, adjustment contents indicate a wind direction such as leftward, rightward, upward, and downward, etc. and strength of an air volume, etc.

Figure 3:
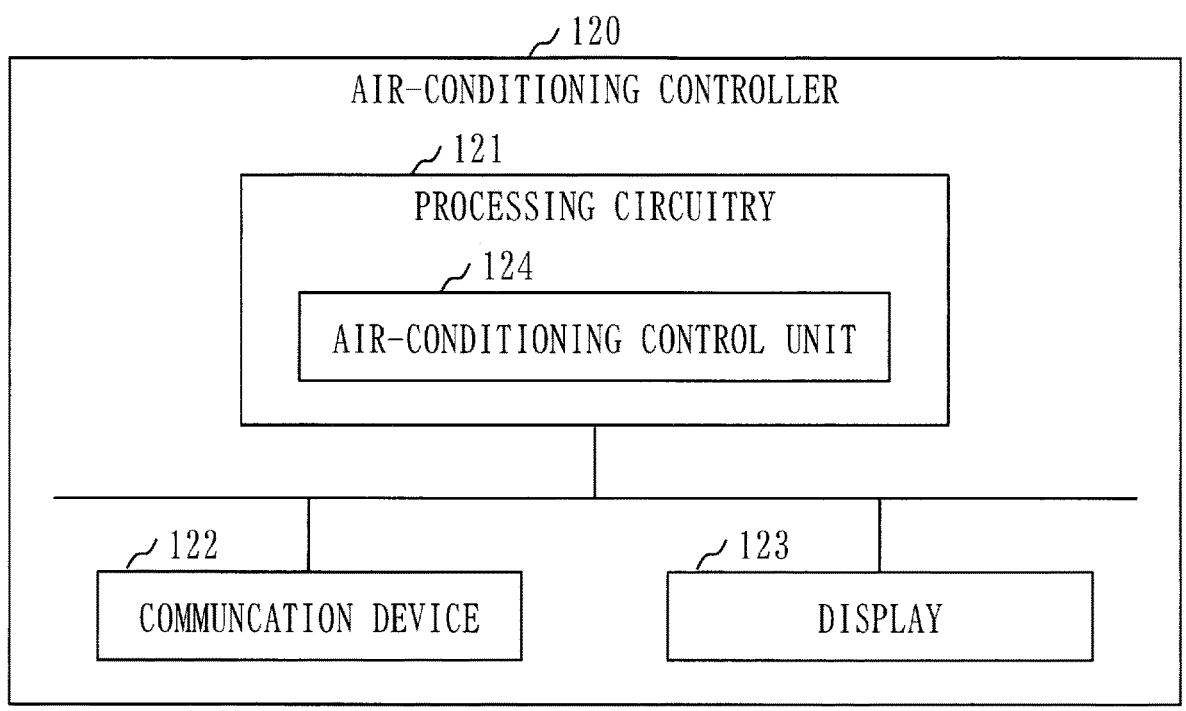
FIG. 3 is a configuration diagram of an air-conditioning controller 120 according to the first embodiment.

Based on FIG. 3, description is made on a configuration of the air-conditioning controller 120.

The air-conditioning controller 120 includes hardware components such as a processing circuitry 121, a communication device 122 and a display 123. These hardware components are connected to one another via a signal line.

The processing circuitry 121 is hardware to realize an air-conditioning control unit 124.

The processing circuitry 121 may be a dedicated hardware component, or may be a processor to execute a program stored in a memory.

When the processing circuitry 121 is a dedicated hardware component, the processing circuitry 121 is, for example, a single circuit, a composite circuit, a programmed processor, a parallel-programmed processor, an ASIC, an FPGA, or a combination thereof.

ASIC is an abbreviation for "application specific integrated circuit."

FPGA is an abbreviation for "field programmable gate array."

In the processing circuitry 121, a part of the functions may be realized by a dedicated hardware component, and the other functions may be realized with software or firmware.

As described above, it is possible to realize the functions of the air-conditioning controller 120 with hardware components, software, firmware or a combination thereof.

The communication device 122 is a receiver and a transmitter. For example, the communication device 122 is a communication chip or an NIC.

NIC is an abbreviation for network interface card.

The display 123 is a display device. For example, the display 123 is a liquid crystal display or a touch panel display.

Figure 4:
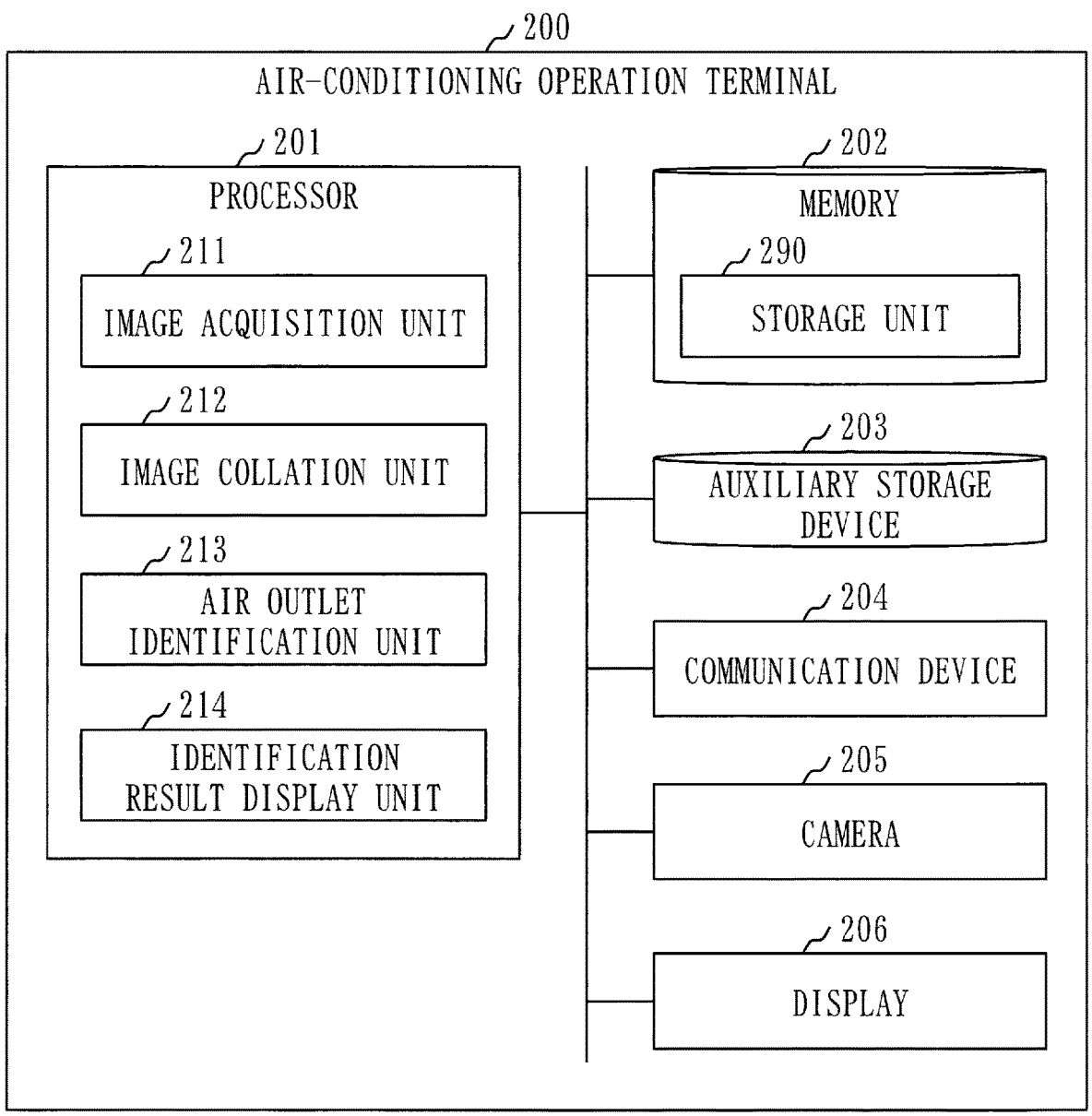
FIG. 4 is a configuration diagram of an air-conditioning operation terminal 200 according to the first embodiment.

Based on FIG. 4, description is made on a configuration of the air-conditioning operation terminal 200.

The air-conditioning operation terminal 200 is a computer including hardware components such as a processor 201, a memory, an auxiliary storage device 203, a communication device 204, a camera 205 and a display 206. These hardware components are connected to one another via a signal line.

The processor 201 is an IC to perform arithmetic processing, which controls other hardware components. For example, the processor 201 is a CPU, a DSP or a GPU.

IC is an abbreviation for "integrated circuit."

CPU is an abbreviation for "central processing unit."

DSP is an abbreviation for "digital signal processor."

GPU is an abbreviation for "graphics processing unit."

The memory 202 is a volatile or non-volatile storage device. The memory 202 is also called a main storage device or a main memory. For example, the memory 202 is a RAM. Data stored in the memory 202 is saved in the auxiliary storage device 203 as needed.

RAM is an abbreviation for "random access memory."

The auxiliary storage device 203 is a non-volatile storage device. For example, the auxiliary storage device 203 is a ROM, an HDD or a flash memory. Data stored in the auxiliary storage device 203 is loaded into the memory 202 as needed.

ROM is an abbreviation for "read only memory."

HDD is an abbreviation for "hard disk drive."

The communication device 204 is a receiver and a transmitter. For example, the communication device 204 is a communication chip or an NIC.

The camera 205 is a photographing device.

The display 206 is a display device. For example, the display 206 is a touch panel display.

The air-conditioning operation terminal 200 includes elements such as an image acquisition unit 211, an image collation unit 212, an air outlet identification unit 213 and an identification result display unit 214. These elements are realized by software.

The auxiliary storage device 203 stores an air-conditioning operation program to make a computer function as the image acquisition unit 211, the image collation unit 212, the air outlet identification unit 213 and the identification result display unit 214. The air-conditioning operation program is loaded into the memory 202, and executed by the processor 201.

The auxiliary storage device 203 further stores an OS. At least a part of the OS is loaded into the memory 202, and executed by the processor 201.

The processor 201 executes the air-conditioning operation program while executing the OS.

OS is an abbreviation for "operating system."

Input and output data of the air-conditioning operation program is stored in a storage unit 290.

The memory 202 functions as the storage unit 290. However, the auxiliary storage device 203, a register inside the processor 201 and a cache memory inside the processor 201, etc. may function as the storage unit 290 instead of the memory 202, or along with the memory 202.

The air-conditioning operation terminal 200 may include a plurality of processors to substitute for the processor 201.

It is possible to record (store) the air-conditioning operation program in a non-volatile recording medium such as an optical disk or a flash memory, etc. in a computer-readable manner.

Figure 5:
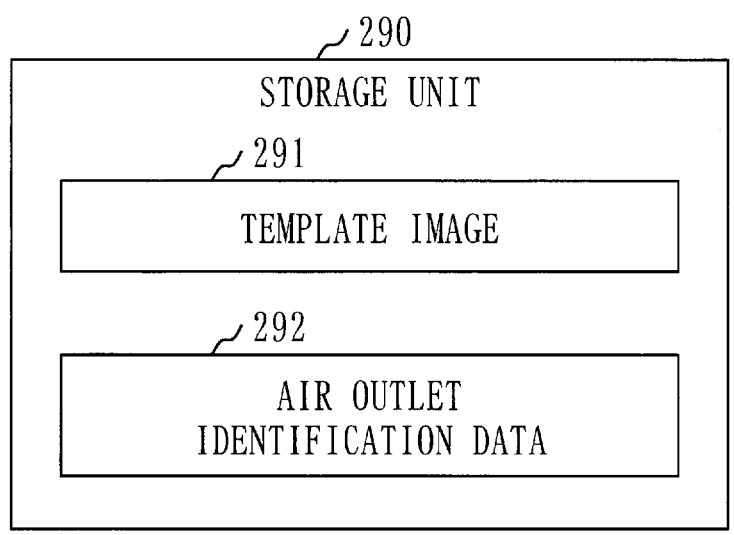
FIG. 5 is a configuration diagram of a storage unit 290 according to the first embodiment.

Based on FIG. 5, description is made on a configuration of the storage unit 290.

The storage unit 290 stores data such as a template image 291 and air outlet identification data 292, etc.

The template image 291 is an image wherein an air-conditioning indoor unit of the same type as the air-conditioning indoor unit 110 is shown, and used as a template for an image of the air-conditioning indoor unit 110. The air-conditioning indoor unit shown in the template image 291 may be the air-conditioning indoor unit 110, or may be a unit different from the air-conditioning indoor unit 110.

The air outlet identification data 292 indicates an air outlet identifier by associating the air outlet identifier with each of the air outlets 111 in the template image 291.

For example, in the air outlet identification data 292, a position of each of the air outlets 111 in the template image 291 and an air outlet identifier of each of the air outlets 111 are associated with each other.

The air outlet identifiers identify the air outlets 111. A concrete example of the air outlet identifier is "vane number."

Explanation of Operation

A procedure of the operation of the air-conditioning operation terminal 200 corresponds to an air-conditioning operation method. Further, a procedure of the operation of the air-conditioning operation terminal 200 corresponds to a procedure of processing by an air-conditioning operation program.

The procedures of the operations of the air-conditioning operation terminal 200 and the air-conditioning controller 120 correspond to an air-conditioning control method.

Figure 6:
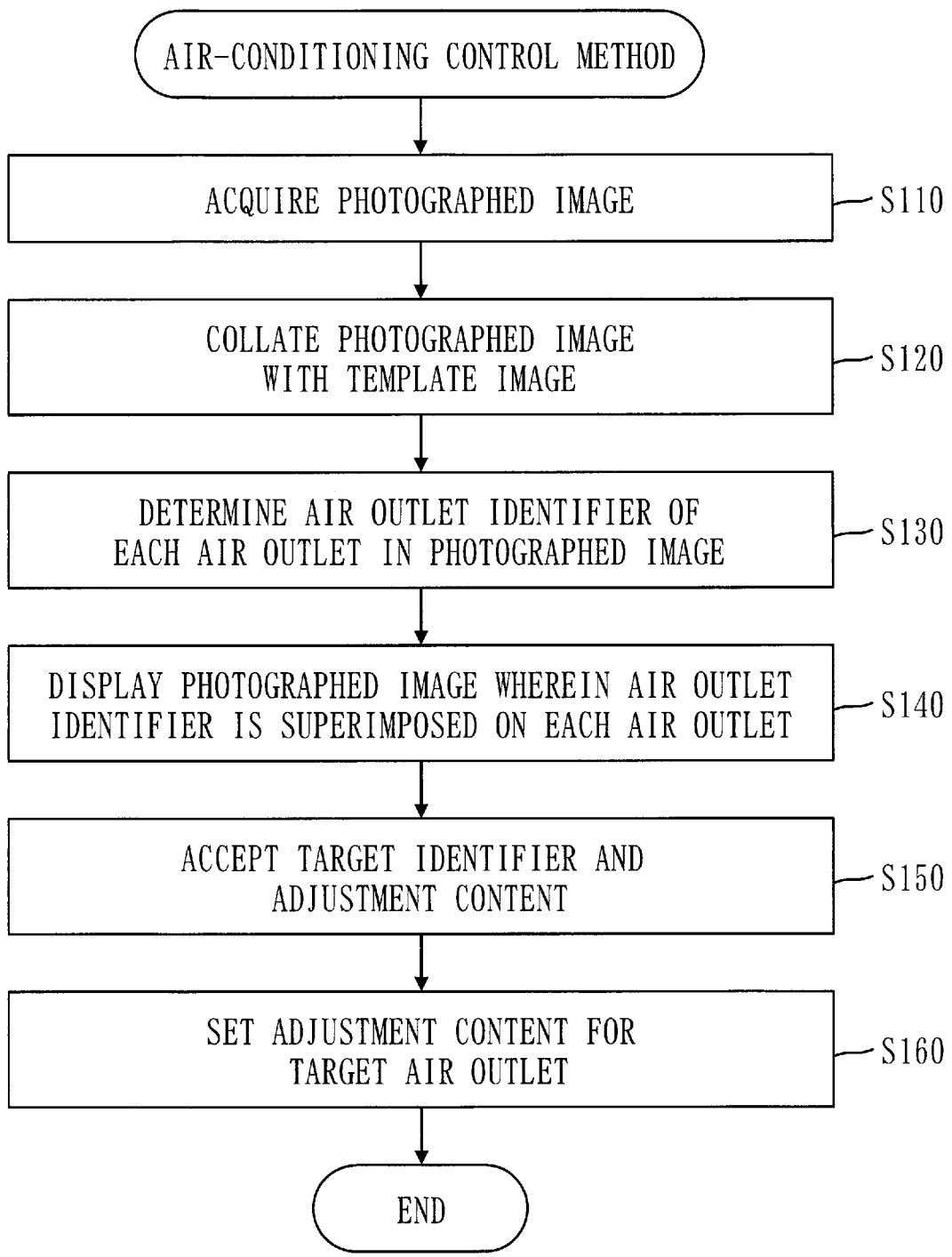
FIG. 6 is a flowchart of an air-conditioning control method according to the first embodiment.

Based on FIG. 6, description is made on the air-conditioning control method.

In step S110, a user operates the camera 205 of the air-conditioning operation terminal 200, and photographs the air-conditioning indoor unit 110.

The camera 205 photographs the air-conditioning indoor unit 110 in accordance with the operation by the user, and outputs an image. The image acquired by photographing is called "photographed image 281."

The image acquisition unit 211 acquires the photographed image 281 from the camera 205, and stores the photographed image 281 in the storage unit 290.

Figure 7:
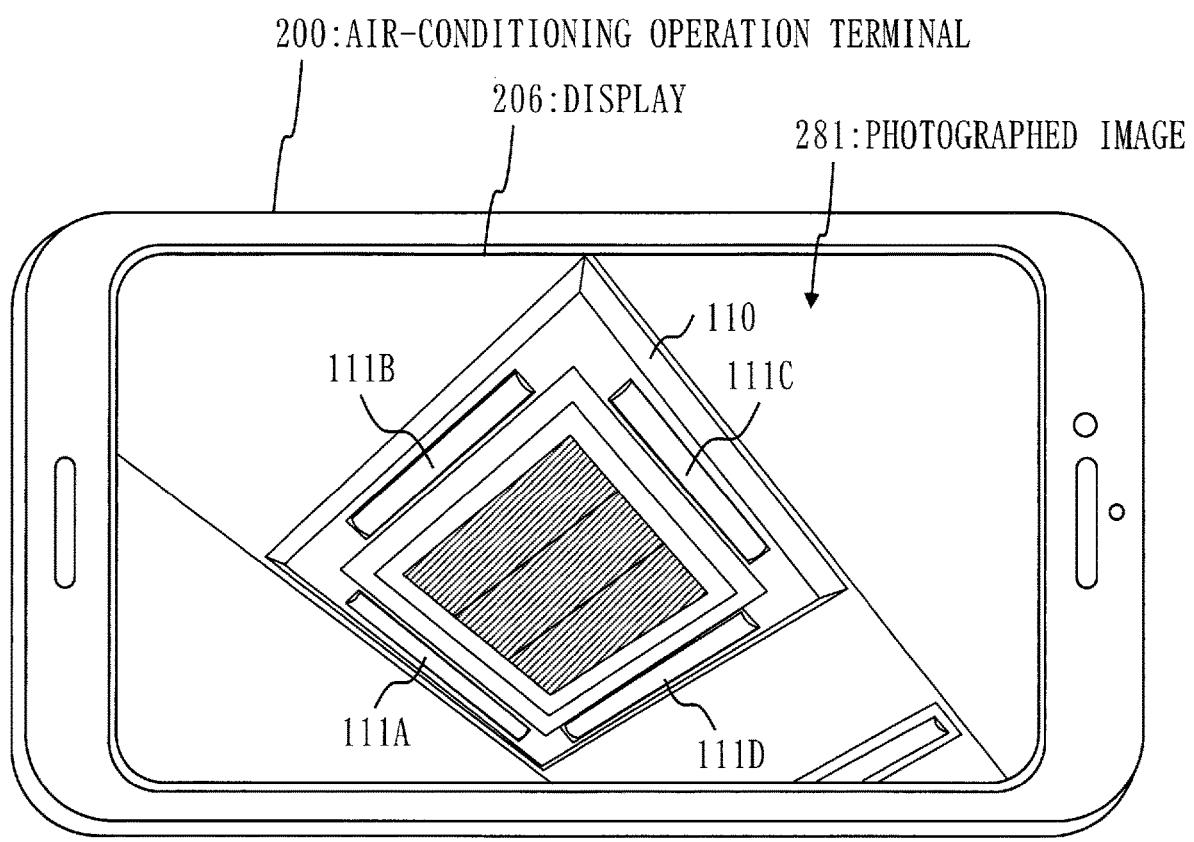
FIG. 7 is a diagram illustrating an example of a photographed image 281 according to the first embodiment.

Based on FIG. 7, description is made on a concrete example of the photographed image 281.

The photographed image 281 is displayed on the display 206 of the air-conditioning operation terminal 200.

The photographed image 281 shows the air-conditioning indoor unit 110. The air-conditioning indoor unit 110 includes four air outlets (111A to 111D). That is, the photographed image 281 shows four air outlets (111A to 111D) of the air-conditioning indoor unit 110.

Returning to FIG. 6, description is continued from step S120.

In step S120, the image collation unit 212 collates the photographed image 281 with the template image 291. For collation, various types of image matching techniques can be used.

For example, collation is performed as follows.

Template feature amount data is stored in the storage unit 290 beforehand. The template feature amount data indicates a feature amount of each pixel of the template image 291.

First, the image collation unit 212 calculates a feature amount for each pixel of the photographed image 281.

Then, the image collation unit 212 collates the photographed image 281 with the template image 291 based on the feature amount of each pixel of the photographed image 281 and the feature amount of each pixel of the template image 291.

The feature amounts can be calculated by techniques such as A-KAZE, ORB or HOG, etc.

A-KAZE is an abbreviation for "accelerated-KAZE."

ORB is an abbreviation for "oriented FAST and rotated BRIEF."

HOG is an abbreviation for "histograms of oriented gradients."

By collation, a rotation angle to match a direction of the air-conditioning indoor unit 110 in the photographed image 281 with a direction of the air-conditioning indoor unit 110 in the template image 291 is calculated.

The rotation angle calculated is called "correction angle."

In step S130, the air outlet identification unit 213 determines an air outlet identifier of each of the air outlets 111 in the photographed image 281 based on the collation result and the air outlet identification data 292.

The air outlet identifier of each of the air outlets 111 in the photographed image 281 are determined as follows.

First, the air outlet identification unit 213 calculates positions of the plurality of air outlets 111 in the photographed image 281 in the case wherein the photographed image 281 is rotated by the correction angle.

Next, the air outlet identification unit 213 selects, from the plurality of air outlets 111 in the template image 291, an air outlet 111 corresponding to a position of each of the air outlets 111 in the photographed image 281 after rotation. The air outlet 111 selected is called "corresponding air outlet."

Then, the air outlet identification unit 213 extracts from the air outlet identification data 292 an air outlet identifier associated with the corresponding air outlet for each of the air outlets 111 in the photographed image 281.

Based on FIG. 8 and FIG. 9, description is made on a concrete example of step S130.

An air-conditioning indoor unit 110P (refer to FIG. 8 and FIG. 9) is an air-conditioning indoor unit 110 inside the photographed image 281.

An air-conditioning indoor unit 110T (refer to FIG. 9) is an air-conditioning indoor unit 110 in the template image 291. Numbers (numbers surrounded by dashed frames) assigned to each of the air outlets 111 of the air-conditioning indoor unit 110T are air outlet identifiers. An air outlet identifier of the air outlet 111 on an upper side is "1," an air outlet identifier of the air outlet 111 on a right side is "2," an air outlet identifier of the air outlet 111 on a lower side is "3," and an air outlet identifier of the air outlet 111 on a left side is "4."

In FIG. 8, the air-conditioning indoor unit 110P is rotated by the correction angle.

In FIG. 9, by comparing the positions of the plurality of air outlets (111A to 111D) in the air-conditioning indoor unit 110P after rotation with the positions of the plurality of air outlets 111 in the air-conditioning indoor unit 110T, the air outlet identifier of each of the air outlets 111 of the air-conditioning indoor unit 110P is determined.

Since the air outlet 111A is located on an upper side, the air outlet identifier of the air outlet 111A is "1."

Since the air outlet 111B is located on a right side, the air outlet identifier of the air outlet 111B is "2."

Since the air outlet 111C is located on a lower side, the air outlet identifier of the air outlet 111C is "3."

Since the air outlet 111D is located on a left side, the air outlet identifier of the air outlet 111D is "4."

Returning to FIG. 6, description is continued from step S140.

In step S140, the identification result display unit 214 displays the photographed image 281 on the display 206 by superimposing an air outlet identifier on each of the air outlets 111 in the photographed image 281.

The photographed image 281 wherein the air outlet identifier is superimposed on each of the air outlets 111 is called "superimposition image 282."

Figure 10:
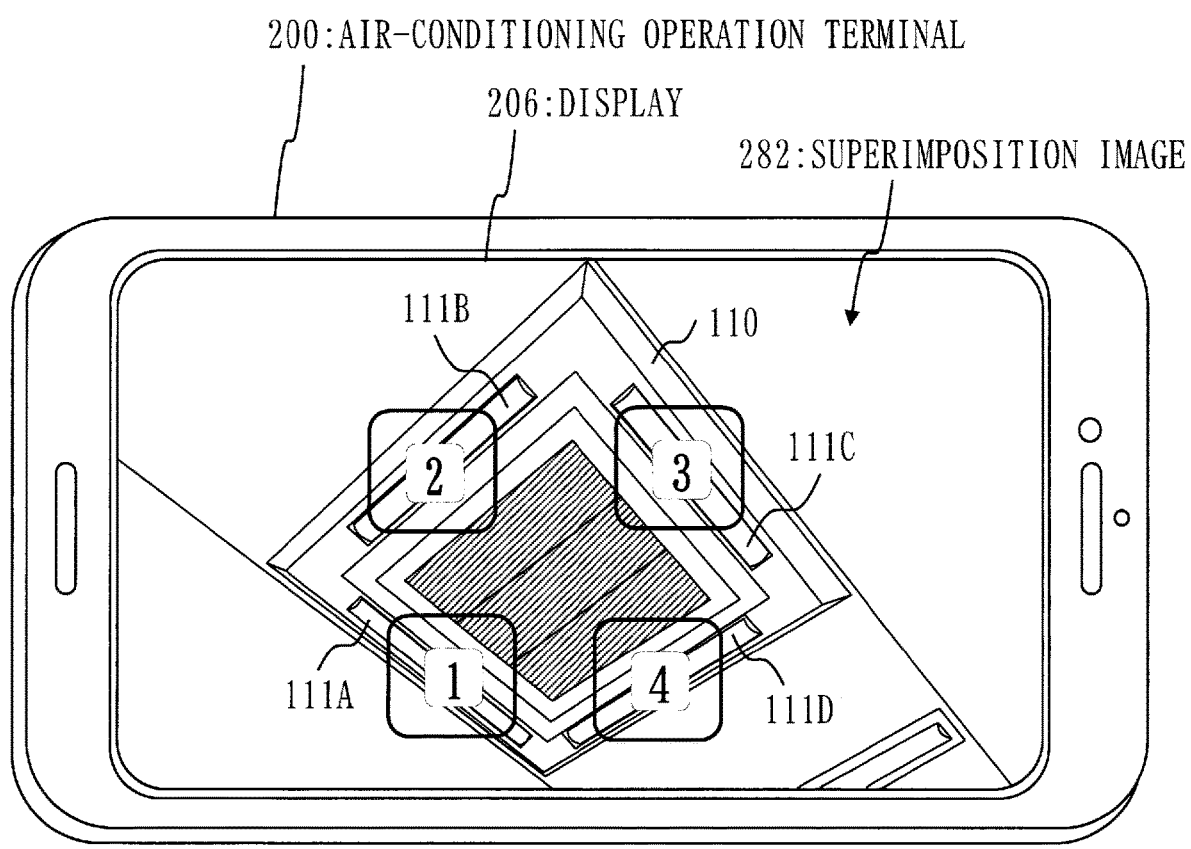
FIG. 10 is a diagram of an example of a superimposition image 282 according to the first embodiment.

Based on FIG. 10, description is made on a concrete example of the superimposition image 282. Numbers surrounded by solid-line frames are air outlet identifiers.

The superimposition image 282 is displayed on the display 206 of the air-conditioning operation terminal 200.

In the superimposition image 282, the air-conditioning indoor unit 110 is shown. An air outlet identifier is superimposed on each of the air outlets 111 in the superimposition image 282.

On the air outlet 111A, the air outlet identifier "1" is superimposed.

On the air outlet 111B, the air outlet identifier "2" is superimposed.

On the air outlet 111C, the air outlet identifier "3" is superimposed.

On the air outlet 111D, the air outlet identifier "4" is superimposed.

Returning to FIG. 6, description is continued from step S150.

In step S150, a user confirms an air outlet identifier of an air outlet 111 whose blowout air is desired to be adjusted, by referring to the superimposition image 282. The air outlet identifier confirmed is called "target identifier."

Then, the user designates a target identifier and an adjustment content to the air-conditioning controller 120 by operating the air-conditioning controller 120.

The air-conditioning control unit 124 of the air-conditioning controller 120 accepts the target identifier and the adjustment content.

In step S160, the air-conditioning control unit 124 sets the adjustment content for the air outlet 111 (target air outlet) identified by the target identifier in the air-conditioning indoor unit 110 by communicating with the air-conditioning indoor unit 110.

The air-conditioning indoor unit 110 adjusts blowout air of the target air outlet in accordance with the adjustment content set.

Effect of First Embodiment

It is possible for the air-conditioning operation terminal 200 to identify each of the plurality of air outlets 111 in the photographed image 281 when the air-conditioning indoor unit 110 is photographed, and to display the superimposition image 282 wherein the air outlet identifier is superimposed on each of the air outlets 111.

Therefore, a user can correctly designate an air outlet 111 whereof the wind direction and the air volume, etc. are desired to be adjusted, by confirming the superimposition image 282.

Therefore, it is possible to perform an operation to adjust the wind direction and the air volume, etc. for each of the air outlets 111 with respect to the air-conditioning indoor unit 110 having a plurality of air outlets 111.

Second Embodiment

Description is made on an embodiment wherein a user designates an air outlet 111 and an adjustment content by operating the air-conditioning operation terminal 200, mainly on different points from those in the first embodiment based on FIG. 11 to FIG. 14.

Explanation of Configuration

The configuration of the air-conditioning system 100 is similar to the configuration in the first embodiment.

However, the configuration of the air-conditioning operation terminal 200 is partly different from that in the first embodiment.

Figure 11:
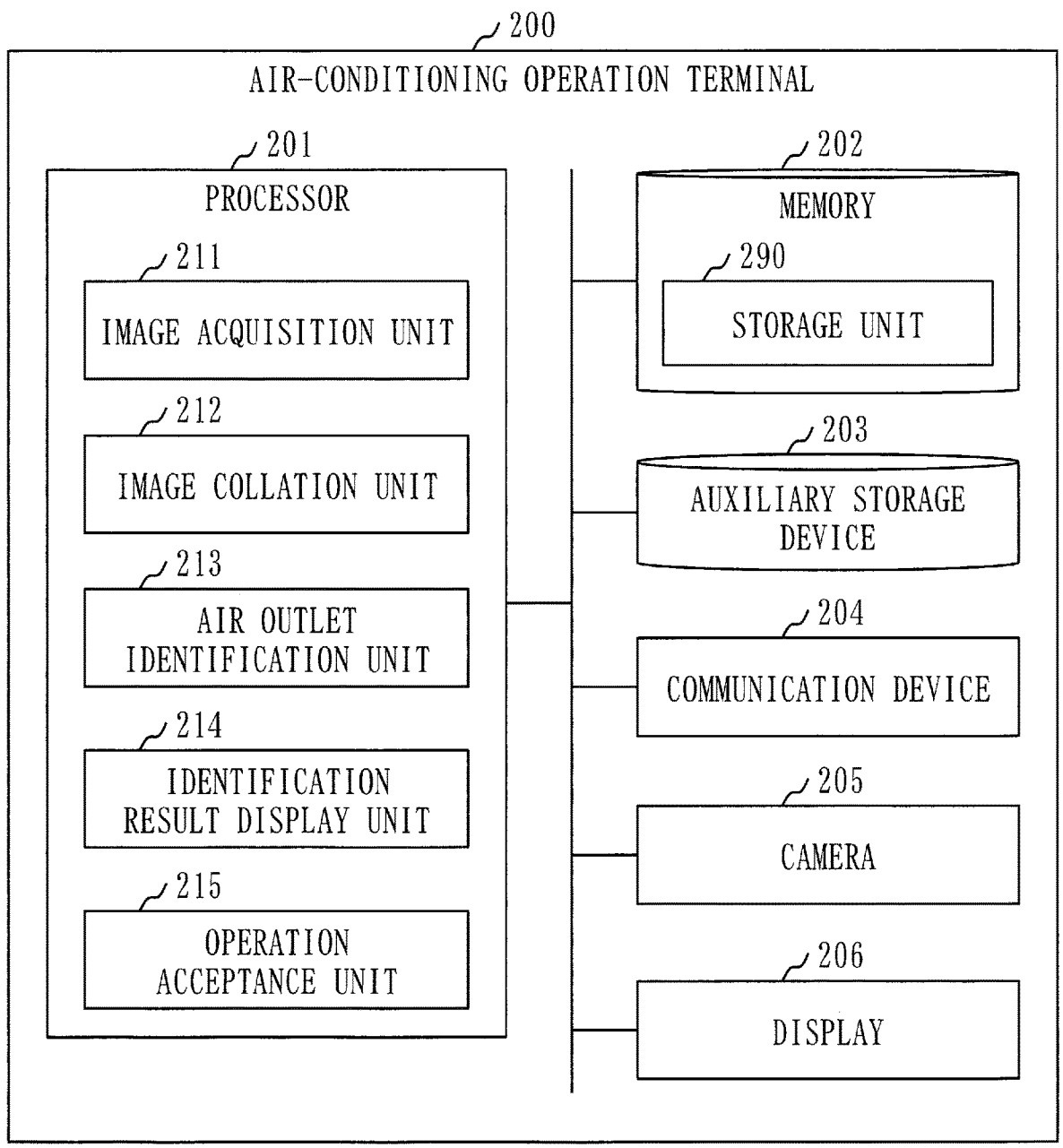
FIG. 11 is a configuration diagram of the air-conditioning operation terminal 200 according to a second embodiment.

Based on FIG. 11, the configuration of the air-conditioning operation terminal 200 will be described.

The air-conditioning operation terminal 200 further includes an operation acceptance unit 215.

The air-conditioning operation program further makes the computer function as the operation acceptance unit 215.

Explanation of Operation

Based on FIG. 12, an air-conditioning control method will be described.

Step S210 to step S240 are the same as step S110 to step S140 in the first embodiment.

By step S240, for example, the superimposition image 282 illustrated in FIG. 10 is displayed on the display 206 of the air-conditioning operation terminal 200.

In the superimposition image 282, an air outlet identifier (number surrounded by a solid-line frame) superimposed on each of the air outlets 111 is used as an air outlet designation interface.

The air outlet designation interface is a graphical user interface (GUI) to designate a target air outlet.

The target air outlet is an air outlet 111 being an adjustment target of blowout air.

The air outlet identifier of the target air outlet is called "target identifier."

In step S250, the user designates a target identifier by touching the air outlet identifier (target identifier) superimposed on the target air outlet in the superimposition image 282.

The operation acceptance unit 215 accepts the target identifier designated. Specifically, the operation acceptance unit 215 detects the touch operation, and determines the air outlet identifier (target identifier) superimposed on the touched part.

However, the user may input the target identifier in the air-conditioning operation terminal 200 by operating an enter key, and the operation acceptance unit 215 may accept the target identifier input.

In step S260, the operation acceptance unit 215 displays the photographed image 281 on the display 206 by superimposing an adjustment interface on the target air outlet in the photographed image 281.

This photographed image 281 may be either the photographed image 281 wherein an air outlet identifier is not superimposed on each of the air outlets 111, or the photographed image 281 (superimposition image 282) wherein an air outlet is superimposed on each of the air outlets 111.

Figure 13:
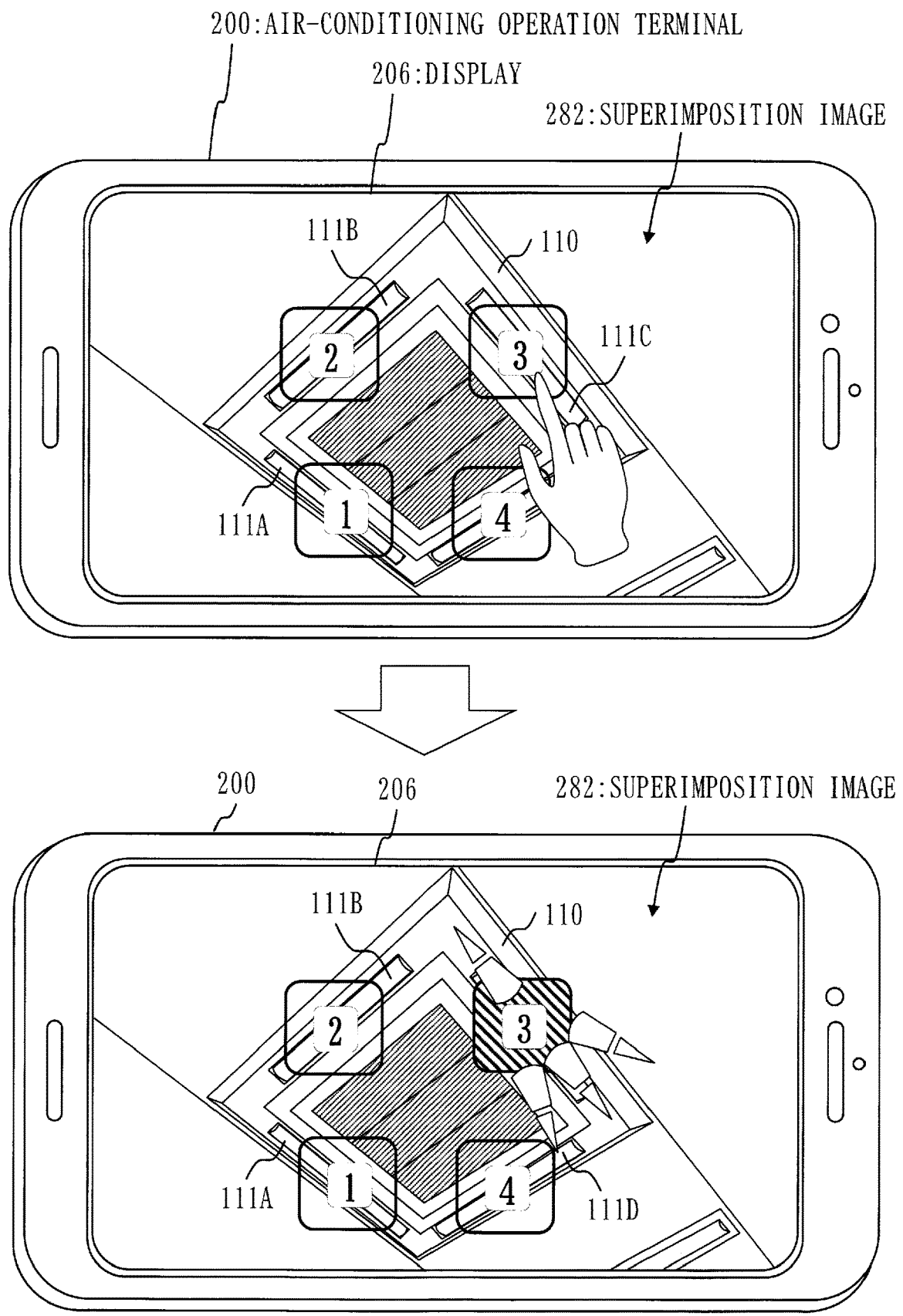
FIG. 13 is an explanatory diagram of step S240 and step S250 according to the second embodiment.

Based on FIG. 13, description is made on a concrete example of step S240 and step S250.

The user touches the air outlet identifier "3" which is superimposed on the air outlet 111C in the superimposition image 282.

The operation acceptance unit 215 detects the touch operation for the air outlet identifier "3," and displays the adjustment interface by superimposing the adjustment interface on the air outlet 111C.

The adjustment interface is a GUI to designate four wind directions (upward, downward, rightward and leftward) and three patterns of air volumes (zero, weak, strong).

Returning to FIG. 12, description is continued from step S270.

In step S270, the user designates an adjustment content by using the adjustment interface in the superimposition image 282.

The operation acceptance unit 215 accepts the adjustment content designated. Specifically, the operation acceptance unit 215 detects an operation for the adjustment interface, and determines the adjustment content based on the operation detected.

Figure 14:
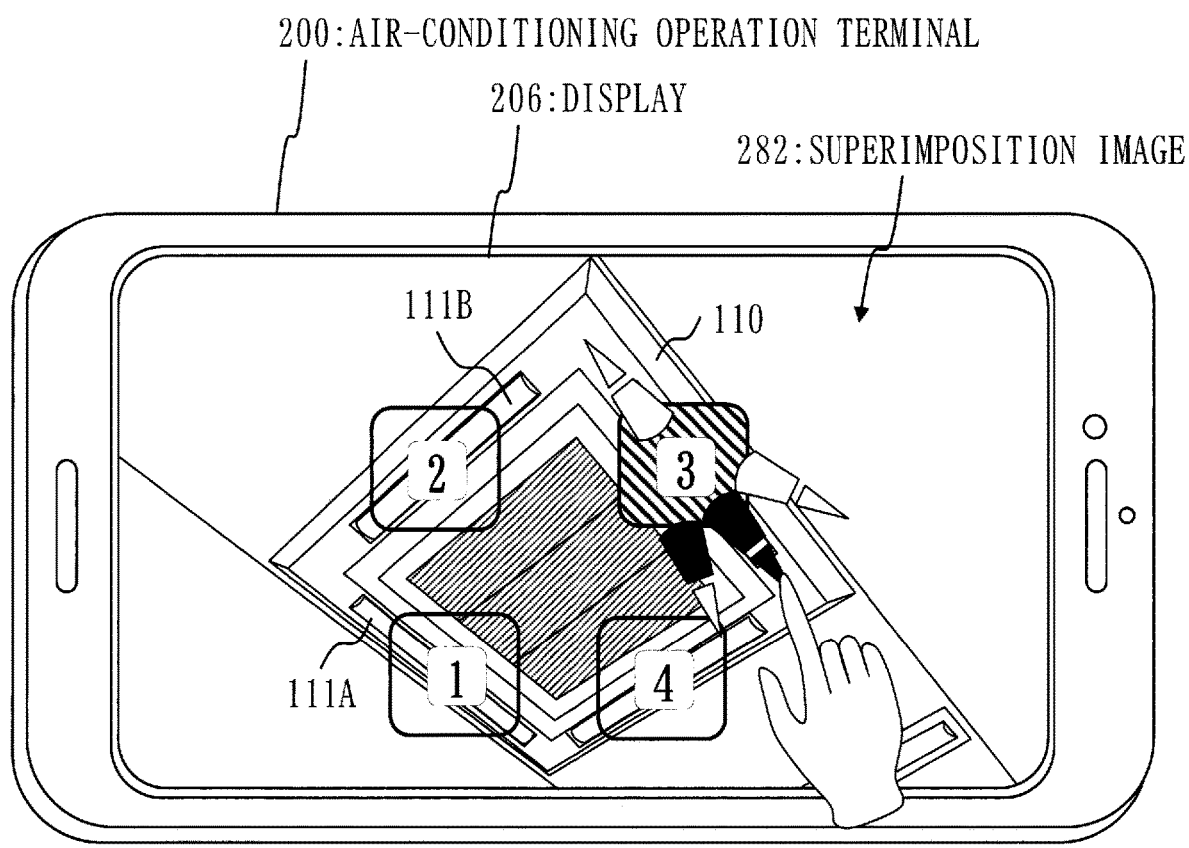
FIG. 14 is an explanatory diagram of step S270 according to the second embodiment.

Based on FIG. 14, description is made on a concrete example of step S270.

The user designates the adjustment content of an air volume "weak" downward, and an air volume "strong" rightward, by touching the adjustment interface in the superimposition image 282.

The operation acceptance unit 215 detects the touch operation for the adjustment interface in the superimposition image 282, and determines the adjustment content designated.

Returning to FIG. 12, step S280 will be described.

In step S280, the operation acceptance unit 215 transmits the target identifier and the adjustment content to the air-conditioning controller 120.

The air-conditioning control unit 124 of the air-conditioning controller 120 receives the target identifier and the adjustment content.

Then, the air-conditioning control unit 124 sets the adjustment content for the air outlet 111 (target air outlet) identified by the target identifier in the air-conditioning indoor unit 110 by communicating with the air-conditioning indoor unit 110.

The air-conditioning indoor unit 110 adjusts blowout air from the target air outlet in accordance with the adjustment content set.

Effect of Second Embodiment

It is possible for the user to adjust blowout air from the target air outlet by using the air-conditioning operation terminal 200 without using the air-conditioning controller 120.

Third Embodiment

Description is made on an embodiment wherein air outlet identification data 292 is automatically generated, mainly on different points from those in the second embodiment based on FIG. 15 to FIG. 18.

Description of Configuration

The configuration of the air-conditioning system 100 is the same as that in the second embodiment.

However, each configuration of the air-conditioning indoor unit 110 and the air-conditioning operation terminal 200 is partly different from that in the second embodiment.

Figure 15:
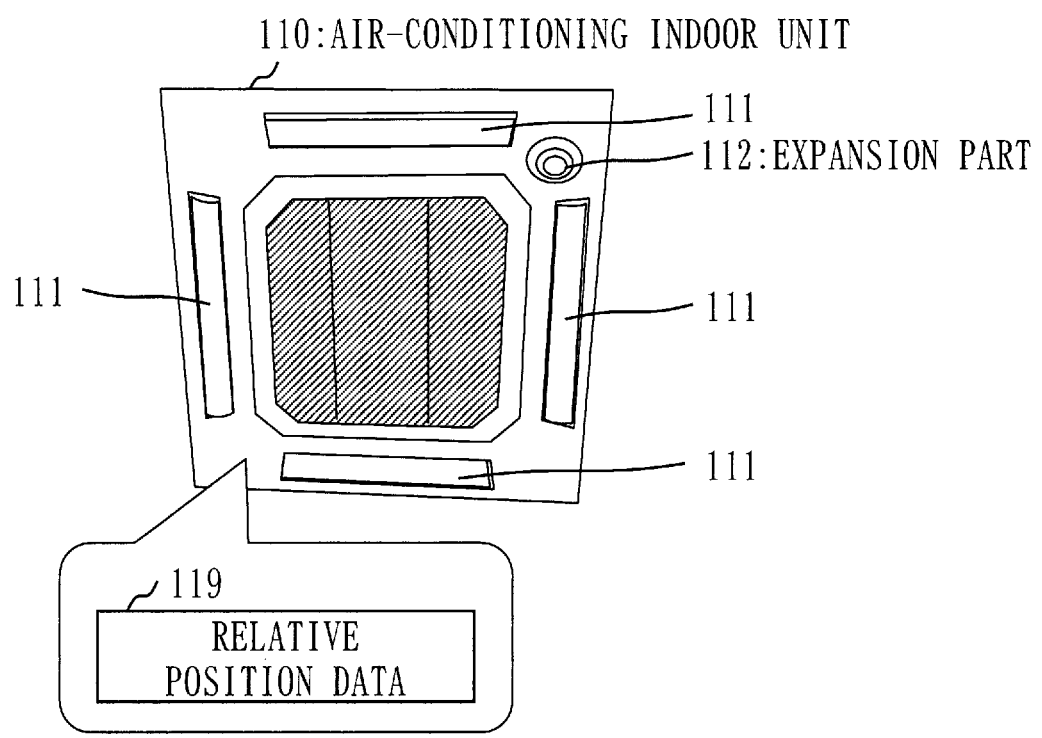
FIG. 15 is a configuration diagram of the air-conditioning indoor unit 110 according to a third embodiment.

Based on FIG. 15, description is made on the configuration of the air-conditioning indoor unit 110.

The air-conditioning indoor unit 110 includes an expansion part 112.

The expansion part 112 is a part provided in the air-conditioning indoor unit 110. For example, the expansion part 112 is a part equipped with a motion sensor and a temperature sensor, etc.

The air-conditioning indoor unit 110 includes a storage unit (for example, a memory), and the storage unit in the air-conditioning indoor unit 110 stores relative position data 119.

The relative position data 119 indicates a relative position between the expansion part 112 and each of the air outlet 111, and an air outlet identifier of each of the air outlets 111.

The air outlet identifier of each of the air outlets 111 can be set by operating a dip switch in the air-conditioning indoor unit 110.

Figure 16:
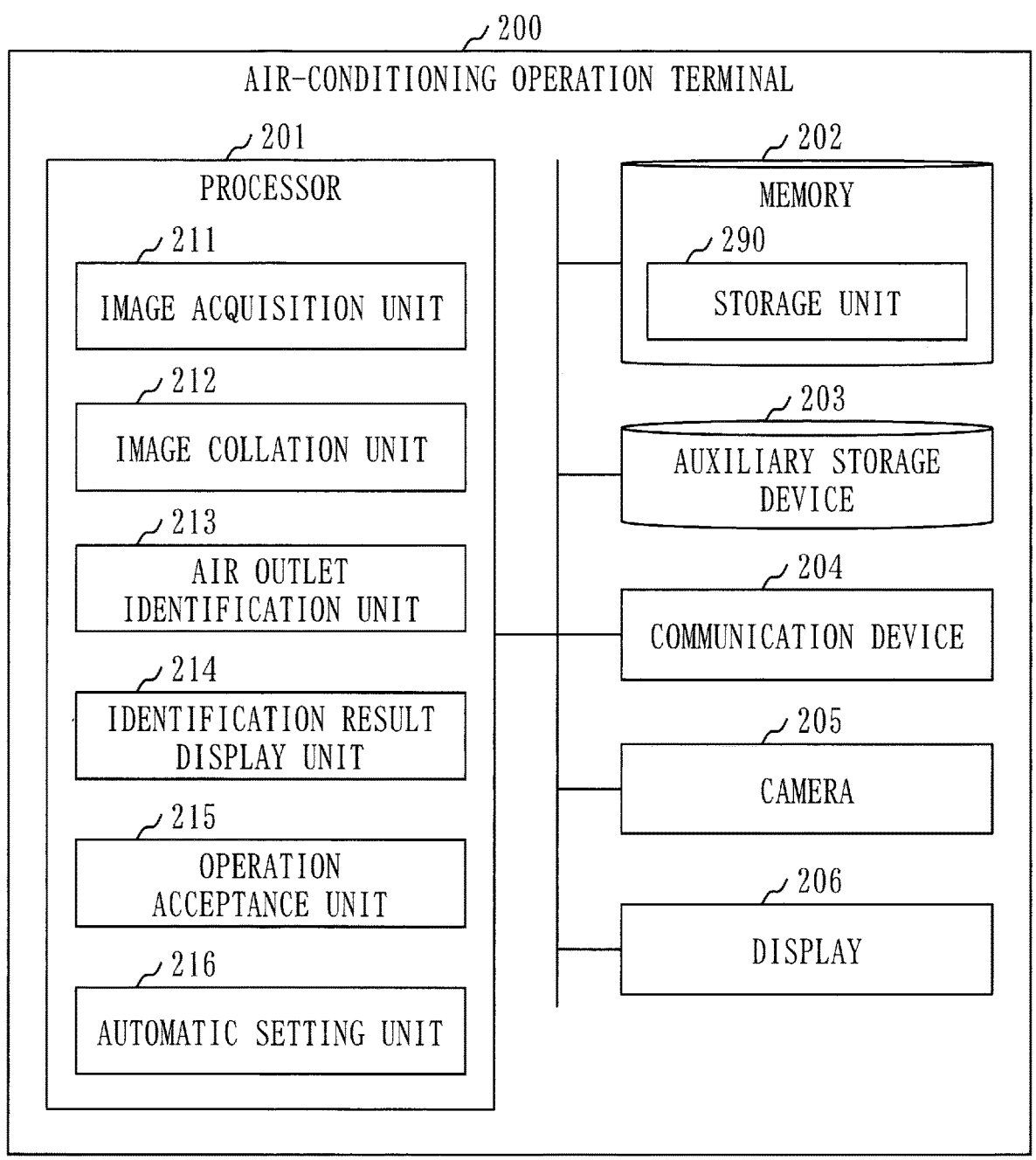
FIG. 16 is a configuration diagram of the air-conditioning operation terminal 200 according to the third embodiment.

Based on FIG. 16, description is made on the configuration of the air-conditioning operation terminal 200.

The air-conditioning operation terminal 200 further includes an automatic setting unit 216.

The air-conditioning operation program further makes a computer function as the automatic setting unit 216.

Explanation of Operation

Figure 17:
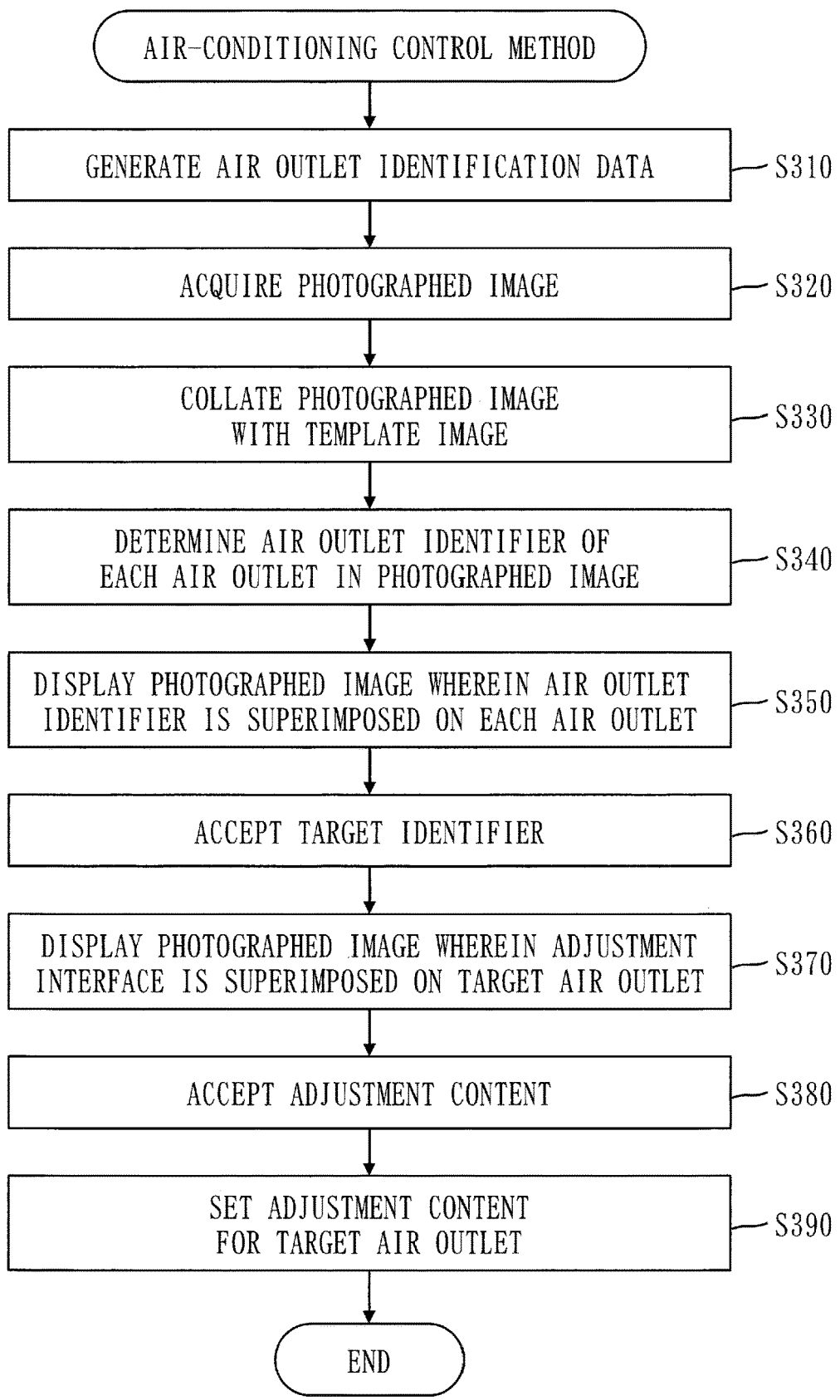
FIG. 17 is a flowchart of an air-conditioning control method according to the third embodiment.

Based on FIG. 17, an air-conditioning control method will be described.

Step S320 to step S390 are the same as step S210 to step S280 in the second embodiment.

In step S310, the automatic setting unit 216 generates the air outlet identification data 292.

Specifically, the automatic setting unit 216 acquires relative position data 119 by communicating with the air conditioner 101. Then, the automatic setting unit 216 generates the air outlet identification data 292 based on the relative position data 119, and a relative position between the expansion part 112 and each of the air outlets 111 in the template image 291.

Then, the automatic setting unit 216 stores the air outlet identification data 292 in the storage unit 290.

Figure 18:
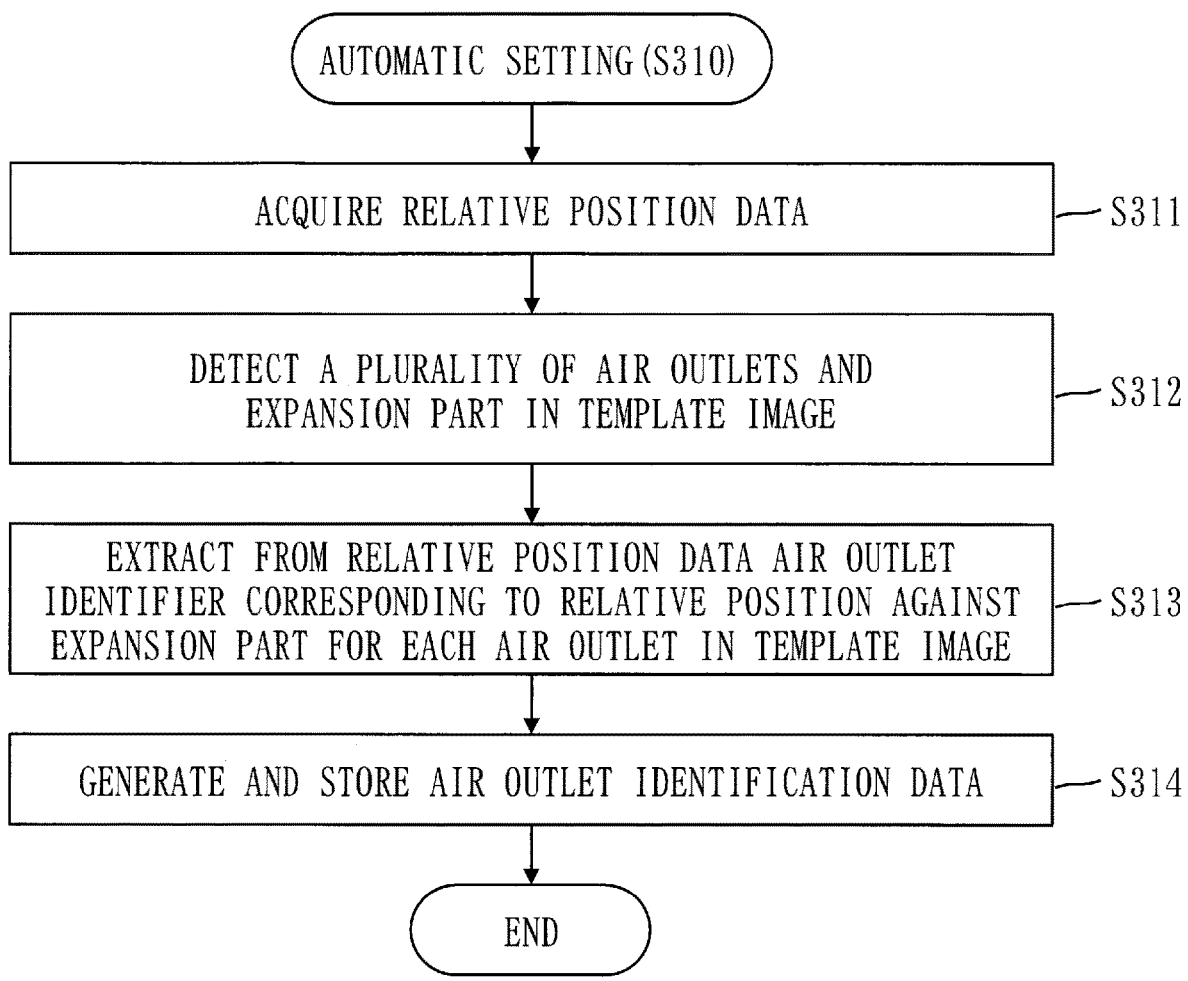
FIG. 18 is a flowchart of an automatic setting (S310) according to the third embodiment.

Based on FIG. 18, a procedure of automatic setting (S310) will be described.

In step S311, the automatic setting unit 216 acquires the relative position data 119 from the air-conditioning indoor unit 110 via the air-conditioning controller 120 by communicating with the air-conditioning controller 120.

In step S312, the automatic setting unit 216 detects the plurality of air outlets 111 and the expansion part 112 in the template image 291 by image processing for the template image 291.

In step S313, the automatic setting unit 216 extracts an air outlet identifier corresponding to the relative position against the expansion part 112 from the relative position data 119, for each of the air outlets 111 in the template image 291.

In step S314, the automatic setting unit 216 generates the air outlet identification data 292 by using the air outlet identifier of each of the air outlets 111 in the template image 291.

Then, the automatic setting unit 216 stores the air outlet identification data 292 in the storage unit 290.

Explanation of Embodiment

The third embodiment may be implemented in combination with the first embodiment. That is, the air-conditioning operation terminal 200 may not include the operation acceptance unit 215.

Effect of Third Embodiment

It is possible for the air-conditioning operation terminal 200 to generate the air outlet identification data 292 automatically. Therefore, there is no need for a user to prepare the air outlet identification data 292, and convenience is improved.

By existence of the expansion part 112, collation precision between the photographed image 281 and the template image 291 is improved.

Fourth Embodiment

Figure 19:
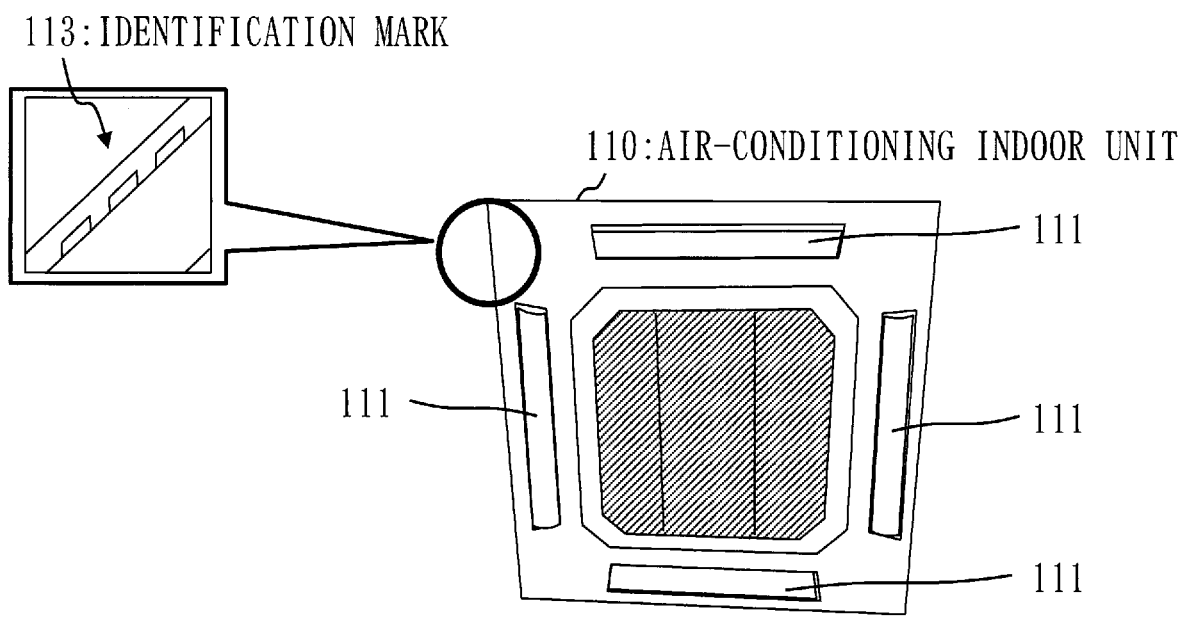
FIG. 19 is a configuration diagram of the air-conditioning indoor unit 110 according to a fourth embodiment.

Description is made on an embodiment to improve collation precision between the photographed image 281 and the template image 291, mainly on different parts from those in the first and second embodiments based on FIG. 19.

Explanation of Configuration

The configuration of the air-conditioning system 100 is the same as the configuration in the second embodiment.

However, the configuration of the air-conditioning indoor unit 110 is partly different from that in the second embodiment.

Based on FIG. 19, the configuration of the air-conditioning indoor unit 110 will be described.

The air-conditioning indoor unit 110 includes an identification mark 113.

The identification mark 113 is arranged in the vicinity of a specific air outlet 111, to identify the specific air outlet 111. For example, the identification mark 113 is a notch formed in an end on a side where the specific air outlet 111 is placed.

Explanation of Operation

Figure 12:
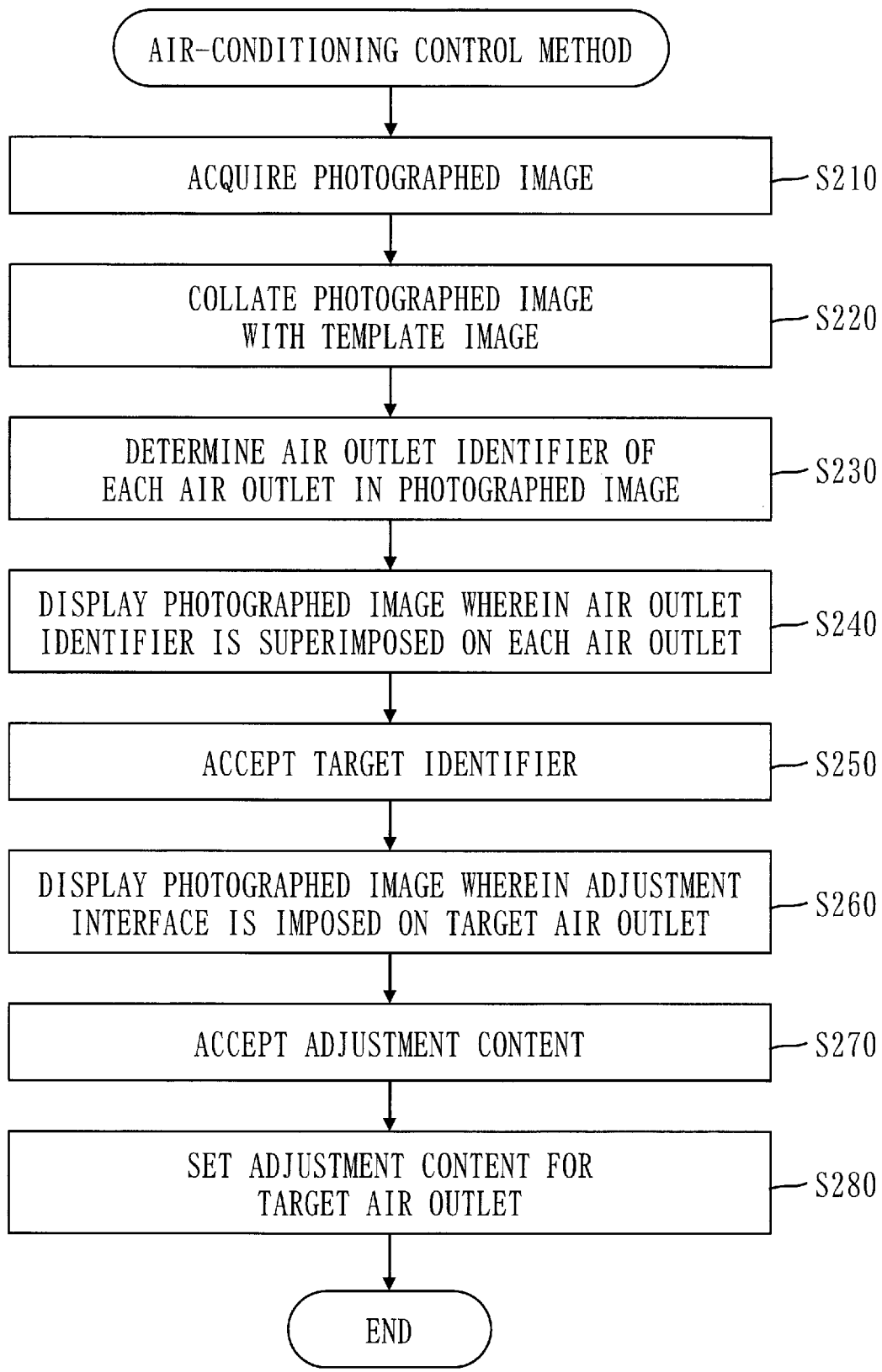
FIG. 12 is a flowchart of an air-conditioning control method according to the second embodiment.

An air-conditioning control method is the same as the method in the second embodiment (refer to FIG. 12).

Explanation of Embodiment

The fourth embodiment may be implemented in combination with the first embodiment. That is, the air-conditioning operation terminal 200 may not include the operation acceptance unit 215.

The fourth embodiment may be implemented in combination with the third embodiment. That is, the air-conditioning indoor unit 110 may include the expansion part 112. The air-conditioning indoor unit 110 may store the relative position data 119. Further, the air-conditioning operation terminal 200 may include the automatic setting unit 216.

Effect of Fourth Embodiment

By existence of the identification mark 113, collation precision between the photographed image 281 and the template image 291 is increased.

Fifth Embodiment

Figure 20:
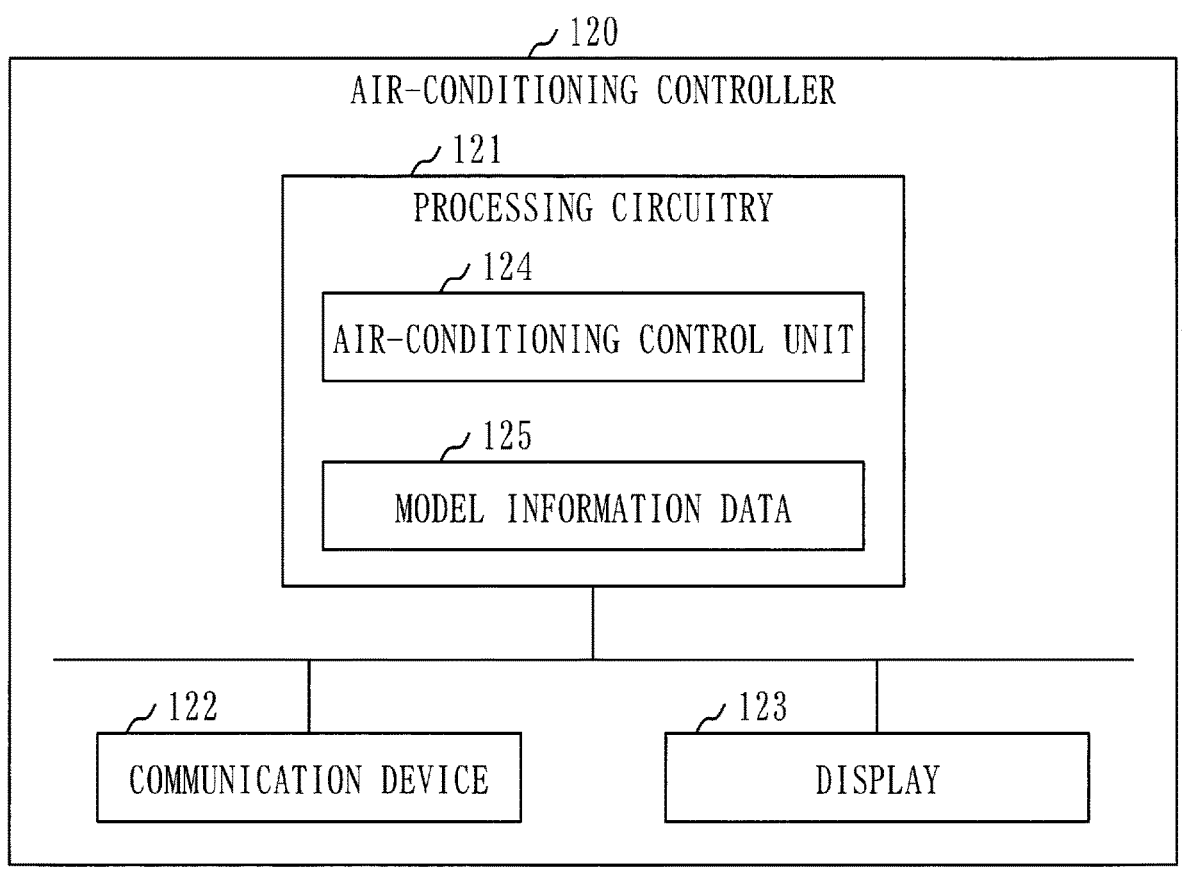
FIG. 20 is a configuration diagram of the air-conditioning controller 120 according to a fifth embodiment.
Figure 21:
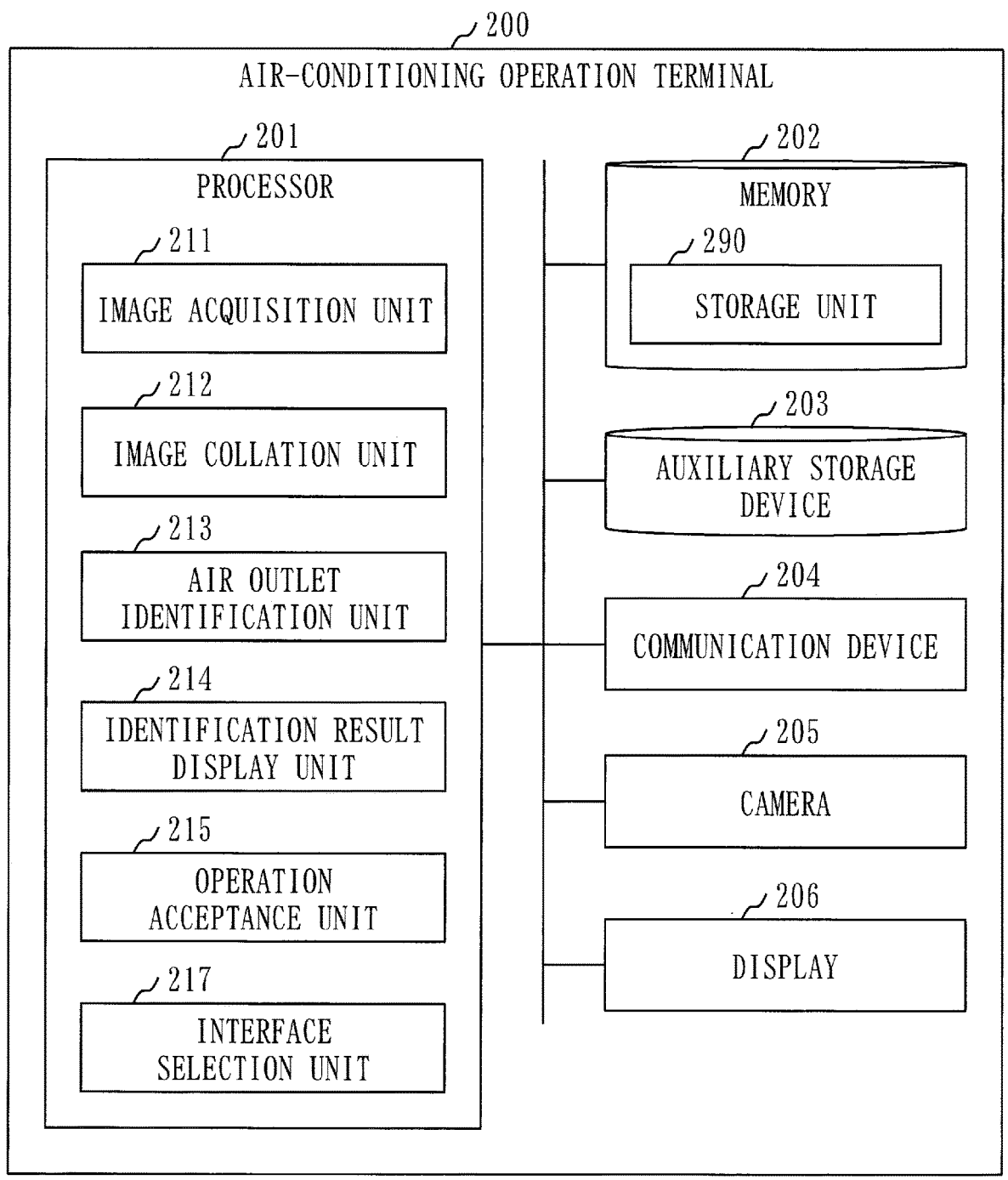
FIG. 21 is a configuration diagram of the air-conditioning operation terminal 200 according to the fifth embodiment.
Figure 22:
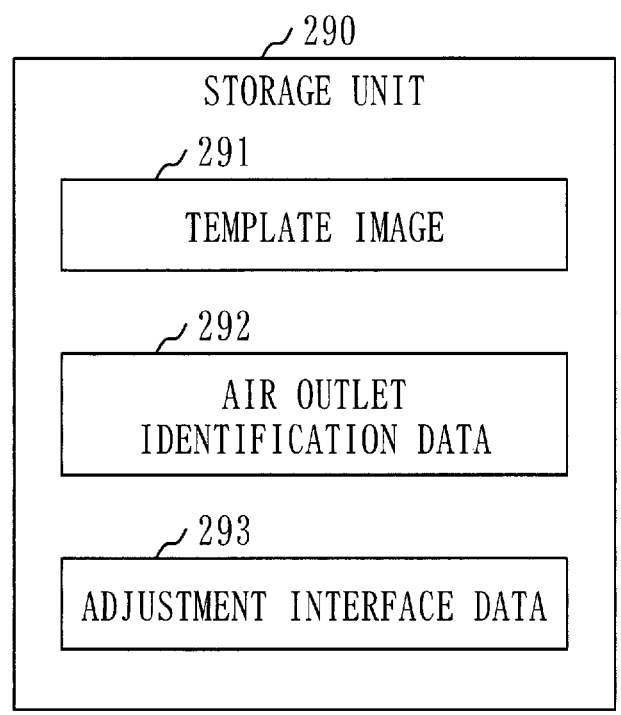
FIG. 22 is a configuration diagram of the storage unit 290 according to the fifth embodiment.

Description is made on an embodiment wherein adjustment interfaces are changed in accordance with types of the air-conditioning indoor unit 110, mainly on different points from those in the second embodiment based on FIG. 20 to FIG. 22.

Explanation of Configuration

The configuration of the air-conditioning system 100 is the same as that in the second embodiment.

However, each configuration of the air-conditioning controller 120 and the air-conditioning operation terminal 200 is partly different from that in the second embodiment.

Based on FIG. 20, the configuration of the air-conditioning controller 120 will be described.

The processing circuitry 121 includes a storage unit (for example, a memory), and the storage unit of the processing circuitry 121 stores model information data 125.

The model information data 125 indicates a type (model) of the air conditioner 101.

Based on FIG. 21, the configuration of the air-conditioning operation terminal 200 will be described.

The air-conditioning operation terminal 200 further includes an interface selection unit 217.

The air-conditioning operation program further makes the computer function as the interface selection unit 217.

Based on FIG. 22, the configuration of the storage unit 290 will be described.

The storage unit 290 further stores adjustment interface data 293.

The adjustment interface data 293 indicates an adjustment interface for each model.

Since the adjustment item differs depending on the model, the adjustment interface also differs depending on the model.

For example, there exist two types of air conditioners. One air conditioner can adjust both of the wind direction and the air volume; meanwhile, the other air conditioner can adjust only the air volume.

Further, there exist other two types of air conditioners. One air conditioner can adjust the wind direction in both vertical and horizontal directions; meanwhile, the other air conditioner can adjust the wind direction only in the vertical direction.

Explanation of Operation

The air-conditioning control method is the same as the method in the second embodiment (refer to FIG. 12).

However, a process of step S260 is partly different from the process in the second embodiment.

In step S260, the interface selection unit 217 acquires the model information data 125 by communicating with the air-conditioning controller 120.

Next, the interface selection unit 217 selects an adjustment interface corresponding to the model indicated in the model information data 125 from the adjustment interface data 293.

Then, the operation acceptance unit 215 displays the photographed image 281 on the display 206 by superimposing the adjustment interface selected on the target air outlet in the photographed image 281.

Explanation of Embodiment

Fifth embodiment may be implemented in combination with the third embodiment. That is, the air-conditioning indoor unit 110 may include the expansion part 112. The air-conditioning indoor unit 110 may store the relative position data 119. Further, the air-conditioning operation terminal 200 may include the automatic setting unit 216.

The fifth embodiment may be implemented in combination with the fourth embodiment. That is, the air-conditioning indoor unit 110 may include the identification mark 113.

Effect of Fifth Embodiment

It is possible for the air-conditioning operation terminal 200 to change the adjustment interface depending on the type of the air-conditioning indoor unit 110.

Supplement to Embodiment

Figure 23:
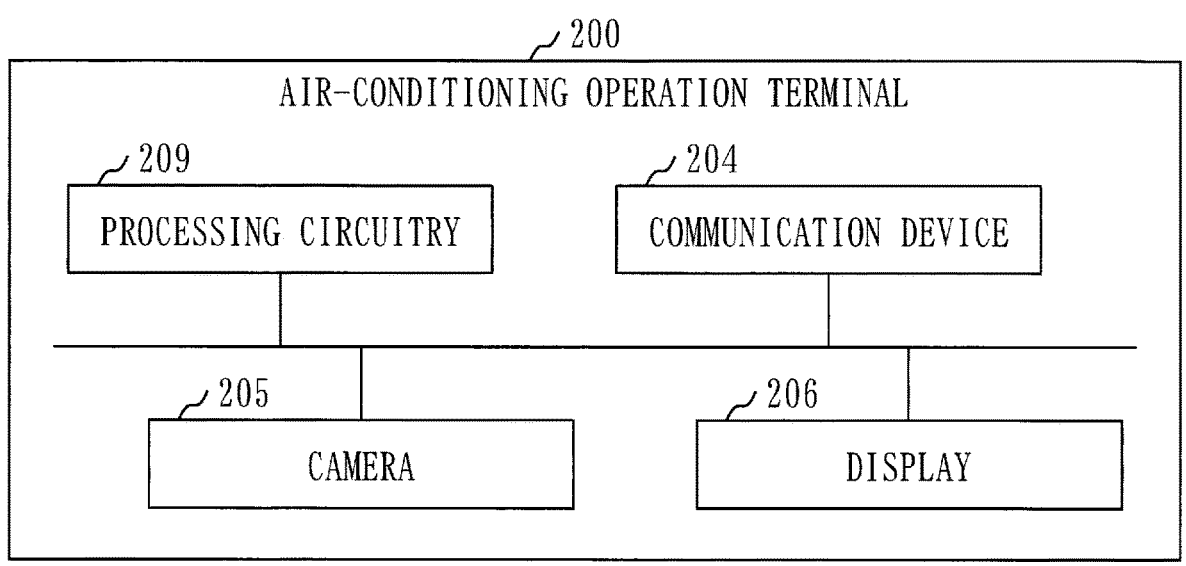
FIG. 23 is a diagram of a hardware configuration of the air-conditioning operation terminal 200 according to the embodiments.

Based on FIG. 23, a hardware configuration of the air-conditioning operation terminal 200 will be described.

The air-conditioning operation terminal 200 includes a processing circuitry 209.

The processing circuitry 209 is a hardware component to realize the image acquisition unit 211, the image collation unit 212, the air outlet identification unit 213, the identification result display unit 214, the operation acceptance unit 215, the automatic setting unit 216 and the interface selection unit 217.

The processing circuitry 209 may be a dedicated hardware component, or may be a processor 201 to execute a program stored in the memory 202.

In a case wherein the processing circuitry 209 is a dedicated hardware component, the processing circuitry 209 is, for example, a single circuit, a composite circuit, a programmed processor, a parallel-programmed processor, an ASIC, an FPGA, or a combination thereof.

The air-conditioning operation terminal 200 may include a plurality of processing circuits to substitute for the processing circuitry 209.

In the processing circuitry 209, a part of the functions may be realized with a dedicated hardware component, and the other functions may be performed with software or firmware.

As described, it is possible to realize the functions of the air-conditioning operation terminal 200 with a hardware component, software, firmware or a combination thereof.

Each embodiment is an example of preferred embodiments, and is not aimed at limiting the technical scope of the present disclosure. Each embodiment may be partly implemented, or may be implemented in combination with other embodiments. The procedures described by using the flowcharts, etc. may be changed appropriately.

The "unit" being an element in the air-conditioning operation terminal 200 may be replaced with "process" or "step."

REFERENCE SIGNS LIST

100: air-conditioning system; 101: air conditioner; 102: air-conditioning outdoor unit; 110: air-conditioning indoor unit; 111: air outlet; 112: expansion part; 113: identification mark; 119: relative position data; 120: air-conditioning controller; 121: processing circuitry; 122: communication device; 123: display; 124: air-conditioning control unit; 125: model information data; 200: air-conditioning operation terminal; 201: processor; 202: memory; 203: auxiliary storage device; 204: communication device; 205: camera; 206: display; 209: processing circuitry; 211: image acquisition unit; 212: image collation unit; 213: air outlet identification unit; 214: identification result display unit; 215: operation acceptance unit; 216: automatic setting unit; 217: interface selection unit; 281: photographed image; 282: superimposition image; 290: storage unit; 291: template image; 292: air outlet identification data; 293: adjustment interface data

The invention claimed is:

1. An air-conditioning operation terminal comprising:
processing circuitry
to acquire a photographed image obtained by photographing an air-conditioning indoor unit including a plurality of air outlets;
an image collation unit to collate a template image wherein an air-conditioning indoor unit of a same type as the air-conditioning indoor unit is shown with the photographed image;
to determine, based on a collation result, and an air outlet identification data indicating an air outlet identifier to be associated with each of a plurality of air outlets in the template image, the air outlet identifier of each of the plurality of air outlets in the photographed image; and
to display the photographed image by superimposing the air outlet identifier on each of the plurality of air outlets in the photographed image, wherein
the air-conditioning indoor unit further includes an expansion part,
an air conditioner including the air-conditioner indoor unit stores relative position data indicating a relative position between the expansion part and each of the plurality of air outlets, and the air outlet identifier of each of the plurality of air outlets, and
the processing circuitry acquires the relative position data by communicating with the air conditioner, and generates the air outlet identification data based on the relative position data, and on a relative position between the expansion part and each of the plurality of air outlets in the template image.

2. The air-conditioning operation terminal as defined in claim 1, wherein the processing circuitry calculates, as the collation result, a correction angle being a rotation angle so as to match a direction of the air-conditioning indoor unit in the photographed image with a direction of the air-conditioning indoor unit in the template image, and
  determines, by extracting from the air outlet identification data the air outlet identifier that is associated with a position of each of the plurality of air outlets in the photographed image in a case wherein the photographed image is rotated by the correction angle, the air outlet identifier of each of the plurality of air outlets in the photographed image.

3. The air-conditioning operation terminal as defined in claim 2, wherein the processing circuitry accepts a target identifier being an air outlet identifier of a target air outlet that is an air outlet to be a target of adjustment of blowout air, displays the photographed image by superimposing an adjustment interface being a graphical user interface to designate an adjustment content of the blowout air on the target air outlet in the photographed image, and accepts the adjustment content designated by using the adjustment interface.

4. The air-conditioning operation terminal as defined in claim 1, wherein the processing circuitry accepts a target identifier being an air outlet identifier of a target air outlet that is an air outlet to be a target of adjustment of blowout air, displays the photographed image by superimposing an adjustment interface being a graphical user interface to designate an adjustment content of the blowout air on the target air outlet in the photographed image, and accepts the adjustment content designated by using the adjustment interface.

5. A non-transitory computer-readable medium recorded with an air-conditioning operation program which causes a computer to execute:
  an image acquisition process of acquiring a photographed image obtained by photographing an air-conditioning indoor unit including a plurality of air outlets;
  an image collation process of collating a template image wherein an air-conditioning indoor unit of a same type as the air-conditioning indoor unit is shown with the photographed image;
  an air outlet identification process of determining, based on a collation result, and an air outlet identification data indicating an air outlet identifier to be associated with each of a plurality of air outlets in the template image, the air outlet identifier of each of the plurality of air outlets in the photographed image;
  an identification result display process of displaying the photographed image by superimposing the air outlet identifier on each of the plurality of air outlets in the photographed image; and
  an automatic setting process, wherein
  the air-conditioning indoor unit further includes an expansion part,
  an air conditioner including the air-conditioner indoor unit stores relative position data indicating a relative position between the expansion part and each of the plurality of air outlets, and the air outlet identifier of each of the plurality of air outlets, and
  the automatic setting process acquires the relative position data by communicating with the air conditioner, and generates the air outlet identification data based on the relative position data, and on a relative position between the expansion part and each of the plurality of air outlets in the template image.

6. An air-conditioning system comprising an air conditioner including an air-conditioning indoor unit, and an air-conditioning operation terminal, wherein
  the air-conditioning indoor unit includes a plurality of air outlets and an expansion part,
  the air conditioner stores relative position data indicating a relative position between the expansion part and each of the plurality of air outlets, and the air outlet identifier of each of the plurality of air outlets, and
  the air-conditioning operation terminal includes:
  processing circuitry
  to acquire a photographed image obtained by photographing the air-conditioning indoor unit;
  to collate a template image wherein an air-conditioning indoor unit of a same type as the air-conditioning indoor unit is shown with the photographed image;
  to determine, based on a collation result, and an air outlet identification data indicating an air outlet identifier to be associated with each of a plurality of air outlets in the template image, the air outlet identifier of each of the plurality of air outlets in the photographed image;
  to display the photographed image by superimposing the air outlet identifier on each of the plurality of air outlets in the photographed image; and
  to acquire the relative position data by communicating with the air conditioner, and generate the air outlet identification data based on the relative position data, and on a relative position between the expansion part and each of the plurality of air outlets in the template image.

* * * * *